(12) United States Patent
Nishihara et al.

(10) Patent No.: US 8,565,617 B2
(45) Date of Patent: Oct. 22, 2013

(54) OPTICAL DEVICE, OPTICAL MODULATION METHOD, AND OPTICAL TRANSMITTER

(75) Inventors: Masato Nishihara, Kawasaki (JP); Tomoo Takahara, Kawasaki (JP); Toshiki Tanaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1161 days.

(21) Appl. No.: 12/219,860

(22) Filed: Jul. 29, 2008

(65) Prior Publication Data

US 2009/0041473 A1 Feb. 12, 2009

(30) Foreign Application Priority Data

Jul. 30, 2007 (JP) ................................. 2007-197804

(51) Int. Cl.
*H04B 10/04* (2006.01)
(52) U.S. Cl.
USPC .......................................... 398/188; 398/198
(58) Field of Classification Search
USPC .................... 398/188, 198, 185, 183; 359/279
See application file for complete search history.

(56) References Cited

U.S. PATENT DOCUMENTS

| | | | |
|---|---|---|---|
| 6,236,488 B1 | 5/2001 | Shimizu et al. | |
| 7,224,906 B2 * | 5/2007 | Cho et al. | 398/183 |
| 7,418,211 B2 * | 8/2008 | Akiyama et al. | 398/198 |
| 7,447,443 B2 * | 11/2008 | Bai | 398/183 |
| 7,817,922 B2 * | 10/2010 | Cho et al. | 398/183 |
| 2004/0081470 A1 | 4/2004 | Griffin | |
| 2007/0212079 A1 * | 9/2007 | Ooi et al. | 398/198 |

FOREIGN PATENT DOCUMENTS

| | | |
|---|---|---|
| JP | 5-110775 | 4/1993 |
| JP | 10-336154 | 12/1998 |
| JP | 2002-353896 | 12/2002 |
| JP | 2004-516743 | 6/2004 |
| JP | 2007-158415 | 6/2007 |
| WO | 2006/065887 A2 | 6/2006 |

OTHER PUBLICATIONS

English language copy of Japanese Office Action for related Japanese Patent Application No. 2007-197804, mailed on Nov. 8, 2011.

* cited by examiner

*Primary Examiner* — M. R. Sedighian
(74) *Attorney, Agent, or Firm* — Staas & Halsey LLP

(57) ABSTRACT

An optical modulation device including waveform shapers that waveform-shape input data signals in synchronism with a rising or falling timing based on comparison with a reference level of an input clock signal, a multi-level phase modulator that generates a multi-level-phase-modulated optical signal based on the data signals waveform-shaped by the plurality of waveform shapers, and outputs the generated optical signal, and a level ratio controller that varies a relative level ratio of the reference level to an amplitude level of the clock signal input to the waveform shapers, based on the optical signal output from the multi-level phase modulator.

23 Claims, 22 Drawing Sheets

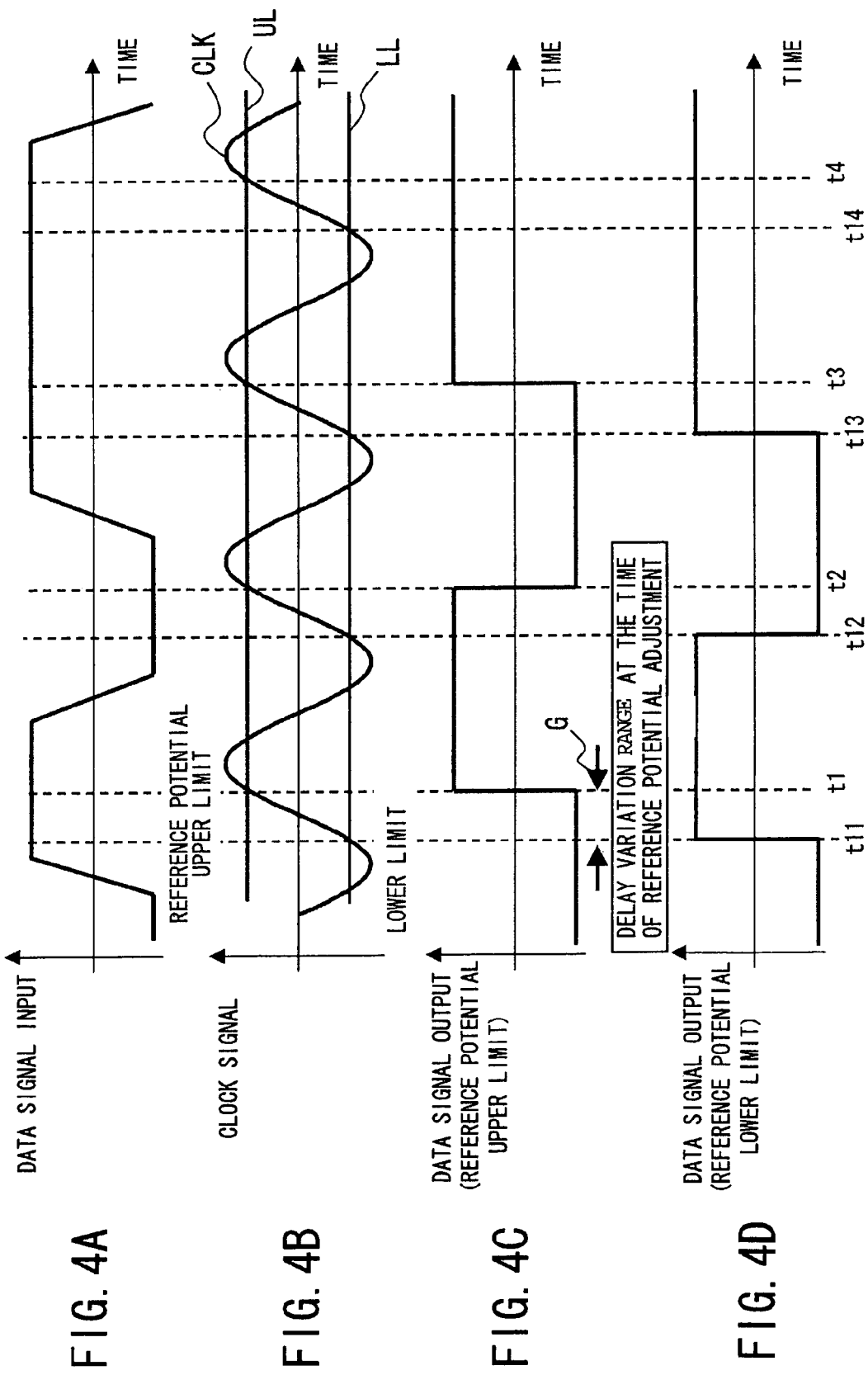

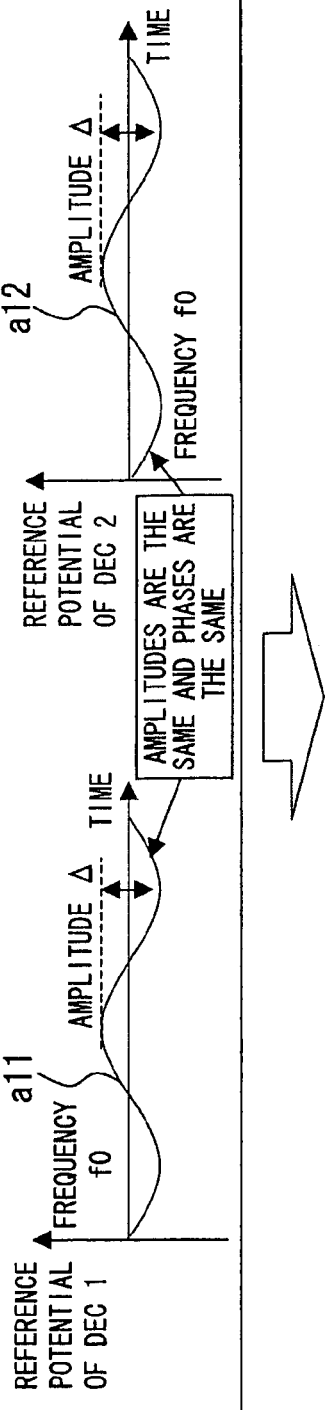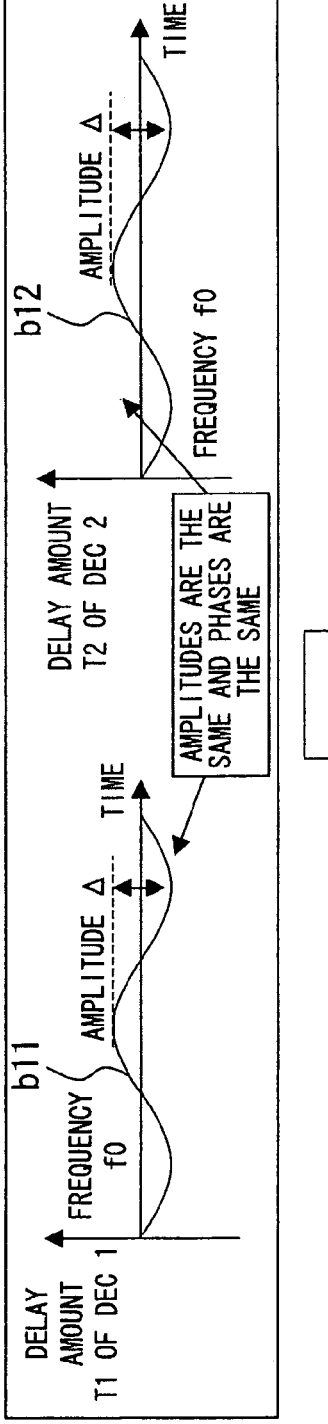

OPTICAL DEVICE, OPTICAL MODULATION METHOD, AND OPTICAL TRANSMITTER

CROSS-REFERENCE TO RELATED APPLICATIONS

This application is related to and claims priority to Japanese Patent Application No. 2007-197804, filed on Jul. 30, 2007, the entire content of which is incorporated herein by reference.

BACKGROUND

1. Field

The embodiments herein are directed to an optical device, an optical modulation method, and an optical transmitter.

2. Description of the Related Art

In recent years, the demand for the introduction of a next-generation 40-Gbps optical transmission system has been increasing with the increase in transmission traffic. Further, the next-generation 40-Gbps optical transmission system requires a transmission distance and a spectral efficiency equal to those of the conventional 10-Gbps system. Modulation methods such as RZ-DPSK (return to zero—differential phase shift keying) and CSRZ-DPSK (carrier-suppressed return-to-zero—DPSK) modulation methods are being actively researched and developed. These modulation methods are excellent in the tolerance to the optical signal to noise ratio (OSNR) and the nonlinear tolerance compared with the NRZ (no return to zero) modulation method that has been applied in the conventional system.

Of these methods, for example, an RZ-DQPSK (RZ-differential quadrature phase-shift keying) modulation method having a characteristic of a narrow spectrum (high spectral efficiency) is a candidate for the modulation method of the next-generation optical transmission system. FIG. 18 illustrates an example of the structure of an optical modulation device adopting the RZ-DQPSK modulation method of, for example, 40-Gbps.

The optical modulation device 100 illustrated in FIG. 18 has a DQPSK modulator 101 and an RZ modulator 102. The DQPSK modulator 101 has an outer Mach-Zehnder interferometer 103. An I arm and a Q arm included in the Mach-Zehnder interferometer 103 have inner Mach-Zehnder interferometers 104$i$ and 104$q$, respectively. The inner Mach-Zehnder interferometers 104$i$ and 104$q$ each perform a binary phase modulation on the input light based on a 20-Gbps data signal. In each of the inner Mach-Zehnder interferometers 104$i$ and 104$q$, an electrode is formed on the arm, and the data signal as a voltage signal is supplied to the electrode, whereby the input light is phase-modulated.

At this time, as the two 20-Gbps data signals input to the DQPSK modulator 101, signals whose waveforms are deteriorated by a preceding circuit are input. Therefore, the signals are waveform-shaped by using D flip-flops (DFFs) 106$i$ and 106$q$. For example, two differential signals (pair of signals which are inverted with respect to each other) corresponding to the input 20 Gbps data signals are output as output data signals in synchronism with a clock signal from a 20-GHz clock signal source 110.

Then, the output data signals from the DFFs 106$i$ and 106$q$ are amplified by driver amplifiers 107$i$ and 107$q$, respectively, and supplied to the electrodes formed on the arms of the inner Mach-Zehnder interferometers 104$i$ and 104$q$ as driving voltage signals of the DQPSK modulator 101. Consequently, phase-modulated light is output from each of the inner Mach-Zehnder interferometers 104$i$ and 104$q$.

Reference sign 108$q$ represents a phase shifter that phase-shifts the light phase-modulated by the inner Mach-Zehnder interferometer 104$q$, by $\pi/2$. The outer Mach-Zehnder interferometer 103 splits the continuous light from a laser diode (LD) 105 so as to be supplied to the inner Mach-Zehnder interferometers 104$i$ and 104$q$, multiplexes the lights phase-modulated by the inner Mach-Zehnder interferometers 104$i$ and 104$q$, and outputs the multiplexed light as a DQPSK-modulated optical signal.

The RZ modulator 102 RZ-modulates the DQPSK optical signal from the DQPSK modulator 101 based on the clock signal input from the clock signal source 110. In this case, a 20-GHz clock signal is used as the driving signal of the RZ modulator 102, and the DQPSK optical signal input to the RZ modulator 102 is pulsed by the 20-GHz clock signal and output as an RZ-DQPSK-modulated optical signal. Reference sign 109 represents a driver amplifier that amplifies the 20-GHz clock signal and supplies it to the RZ modulator 102 as the driving signal.

SUMMARY

It is an aspect of the embodiments discussed herein to provide, an optical device comprising a plurality of waveform shapers that waveform-shape a plurality of input data signals in synchronism with a rising or falling timing based on comparison with a reference level of an input clock signal, a multi-level phase modulator that generates a multi-level-phase-modulated optical signal based on the plurality of data signals waveform-shaped by the plurality of waveform shapers, and outputs the generated optical signal; and a level ratio controller that varies a relative level ratio of the reference level to an amplitude level of the clock signal input to the plurality of waveform shapers, based on the optical signal output from the multi-level phase modulator.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIGS. 4A to 4D illustrate operation of the waveform shapers according to the first embodiment;

FIGS. 6A to 6C illustrate operation of the optical modulation device according to the first embodiment;

DETAILED DESCRIPTION OF THE EMBODIMENTS

Figure 19A:
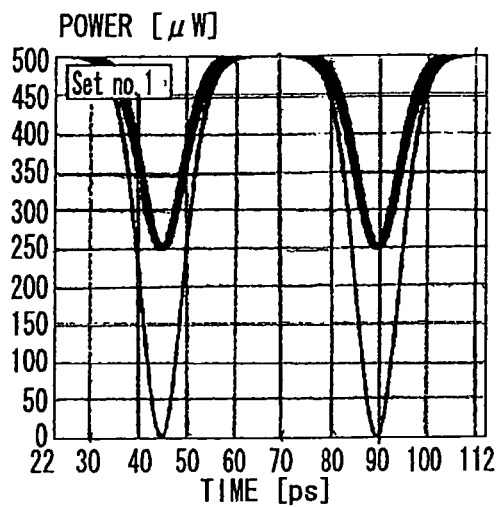
FIGS. 19A to 19C illustrate the output waveforms of the DQPSK modulator when the phase difference between the I and Q arms is 0 ps, −10 ps, and +10 ps, respectively.
Figure 19B:
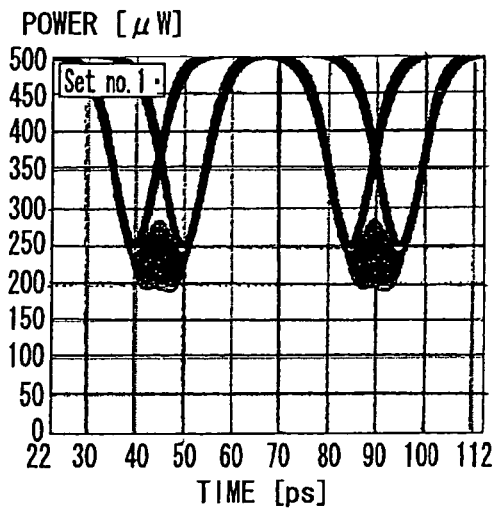
Figure 19C:
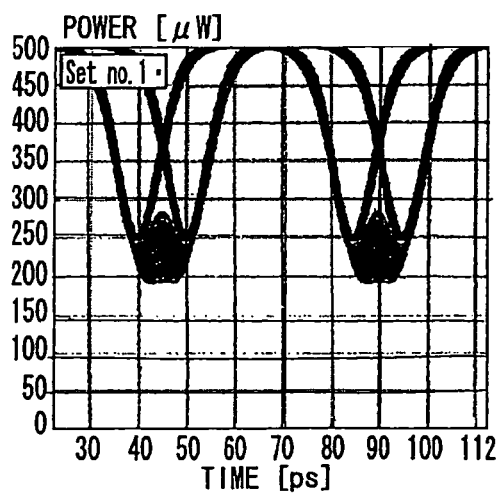
Figure 20A:
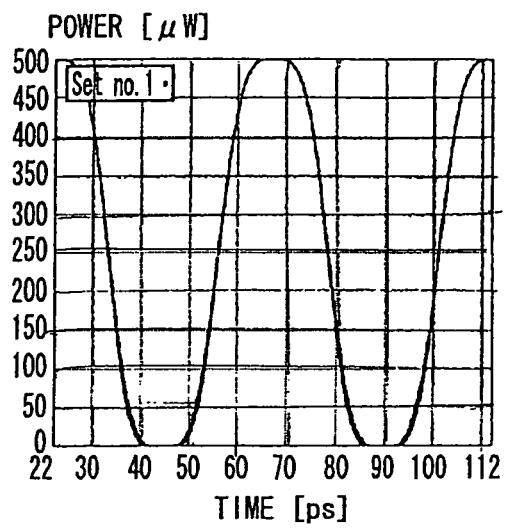
FIGS. 20A to 20C illustrate the output waveforms of the RZ modulator when the phase difference between the I and Q arms is 0 ps, −10 ps, and +10 ps, respectively.
Figure 20B:
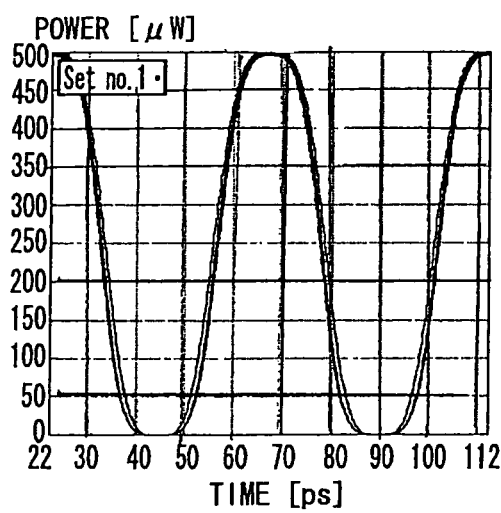
Figure 20C:
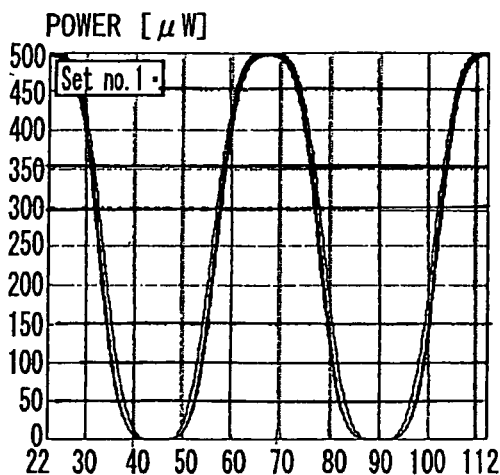

FIGS. 19A to 19C illustrate the output waveforms of the DQPSK modulator 101 when the phase difference between the I and Q arms is 0 ps, −10 ps, and +10 ps, respectively. FIGS. 20A to 20C illustrate the output waveforms of the RZ modulator 102 when the phase difference between the I and Q arms is 0 ps, −10 ps, and +10 ps, respectively. In the figures, the horizontal axis represents the time [ps], and the vertical axis represents the power [μW].

As illustrated in FIGS. 19B and 19C, when there is a phase difference between the I and Q arms, the output waveform is deteriorated compared with when there is no phase difference (FIG. 19A). In this case, as illustrated in FIGS. 20B and 20C, in the RZ modulator 102, the output waveform is also deteriorated compared with when there is no substantial phase difference (FIG. 20A) since the output waveform of the output light from the DQPSK modulator 101 is deteriorated.

Figure 21A:
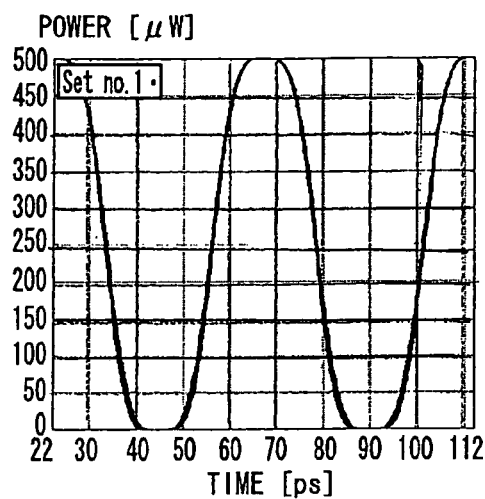
FIGS. 21A to 21C illustrate the output waveforms of the RZ modulator when the phase difference between Data and Clk in the case where the phase difference between the I and Q arms is 0 ps is 0 ps, −5 ps, and +5 ps, respectively.
Figure 21B:
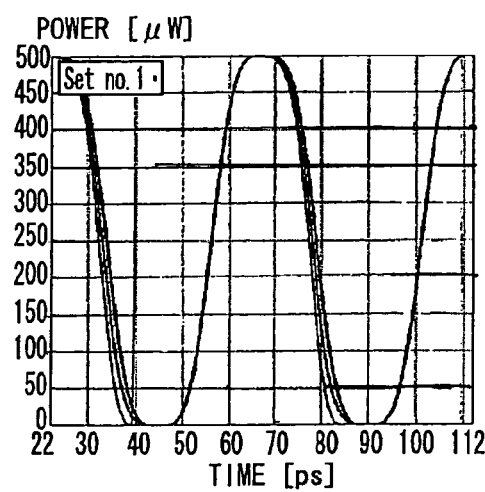
Figure 21C:
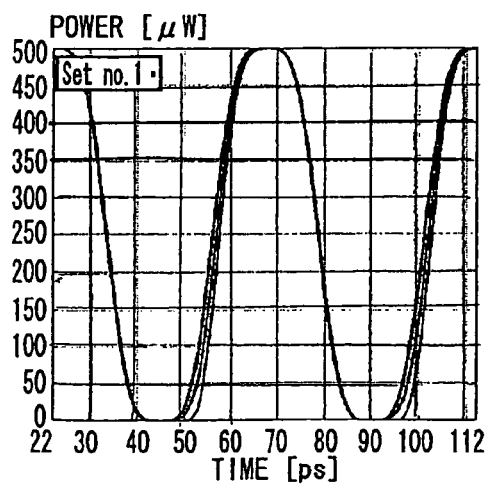

FIGS. 21A to 21C illustrate the output waveforms of the RZ modulator 102 when the phase difference between Data and Clk in the case where the phase difference between the I and Q arms is 0 ps is 0 ps, −5 ps, and +5 ps, respectively. As illustrated in FIGS. 21B and 21C, when there is a phase difference between Data and Clk, the output waveform is deteriorated compared with when there is no substantial phase difference (see FIG. 21A]

Figure 22:
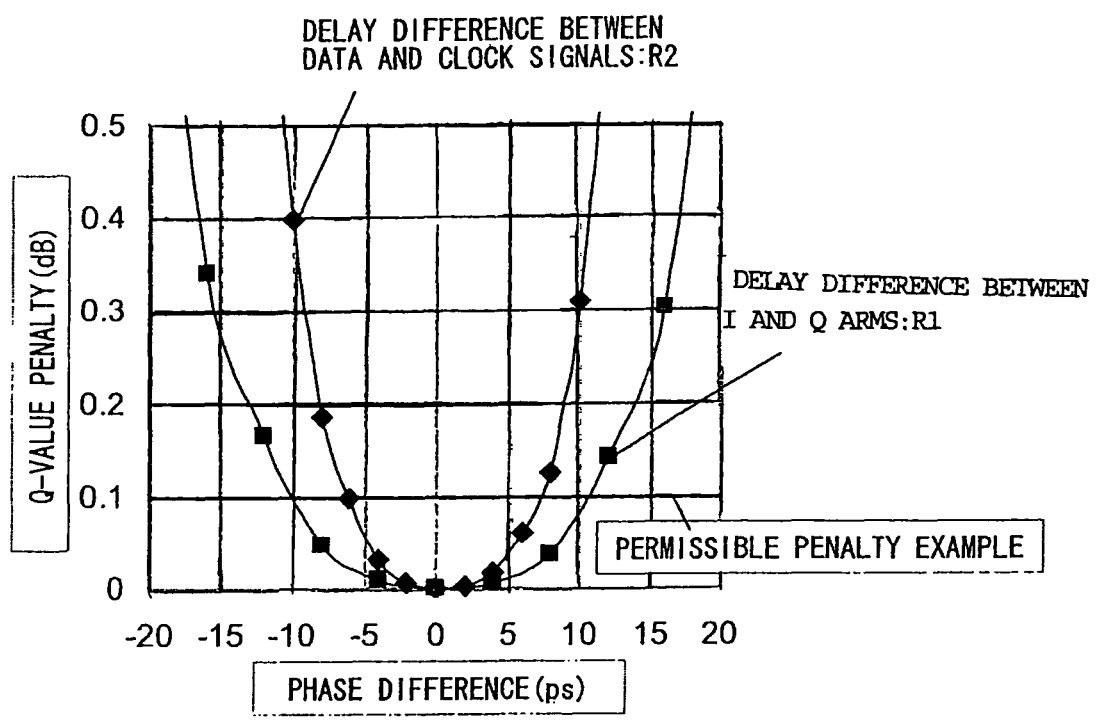
FIG. 22 illustrates the relation between the phase difference between the I and Q arms and the Q-value penalty and the relation between the phase difference between Data and Clk and the Q-value penalty in the optical modulation device.

FIG. 22 illustrates the relation (R1) between the phase difference [ps] between the I and Q arms and the Q-value penalty [dB] and the relation (R2) between the phase difference [ps] between Data and Clk and the Q-value penalty [dB] in the optical modulation device 100. As illustrated in FIG. 22, when the value of the Q penalty in the case where the phase differences between the I and Q arms and between Data and Clk are both 0 ps is used as the reference, in both of the relations, as the phase difference increases, the value of the Q penalty increases to deteriorate the signal quality.

When the penalty amount permissible to each phase difference is, for example, 0.1 dB, the delay difference permissible to the delay difference between the I and Q arms is approximately ±10 ps, and the delay difference permissible to the delay difference between Data and Clk is approximately ±6 ps.

For this, it is considered to suppress the occurrence of the phase differences as described above, for example, by compensating for the phase difference between the driving signals of the DQPSK modulator 101 by using temperature monitoring information.

Figure 1:
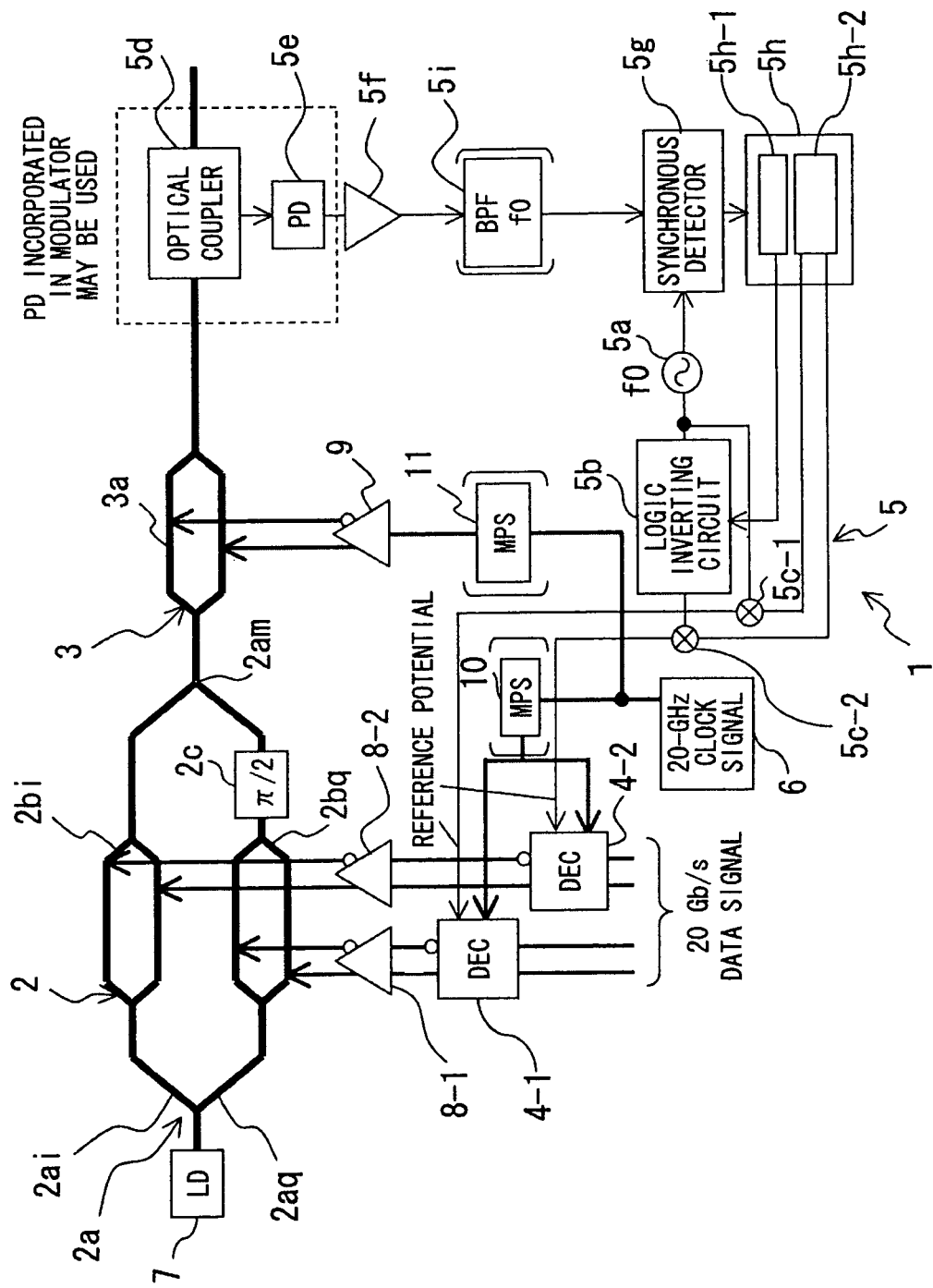
FIG. 1 illustrates an optical modulation device according to a first embodiment.
Figure 18:
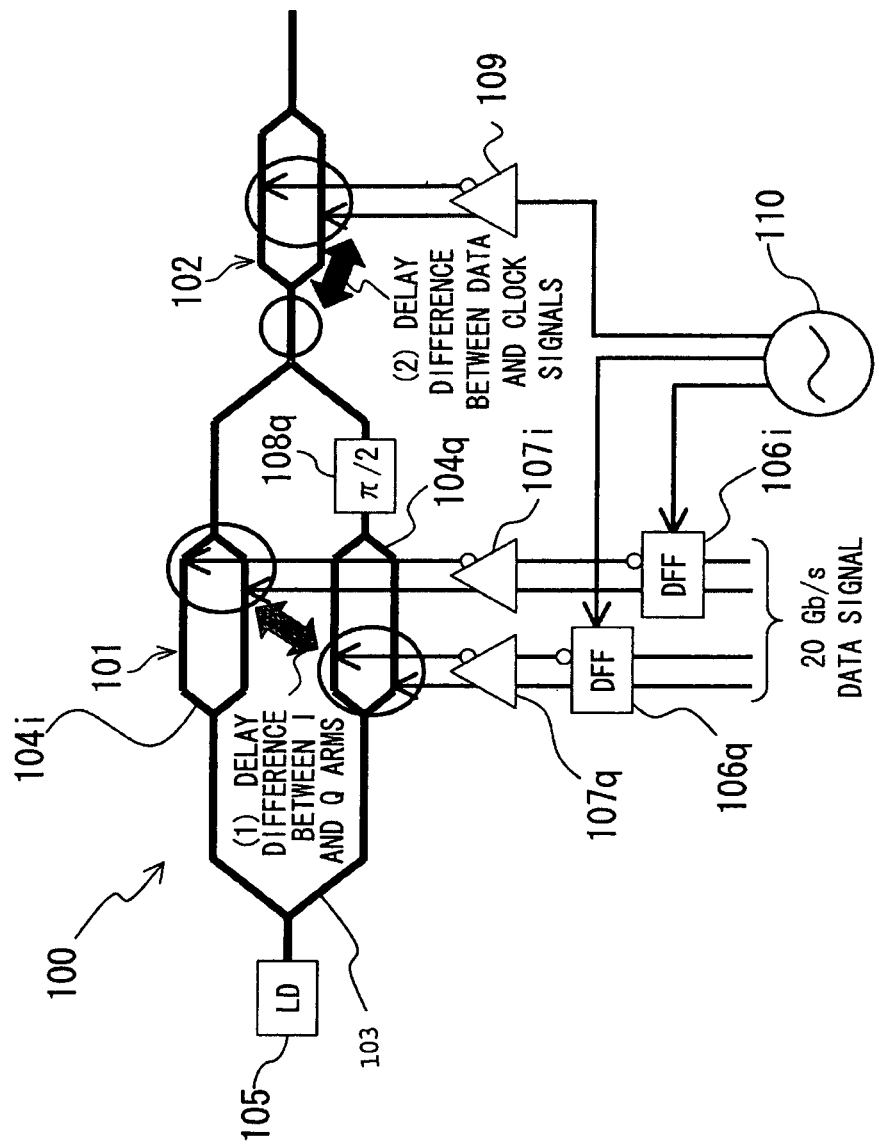
FIG. 18 illustrates the example of the structure of the optical modulation device employing the 40-Gbps RZ-DQPSK modulation method.

FIG. 1 illustrates an optical modulation device according to the first embodiment. The optical modulation device 1 illustrate in FIG. 1 is applicable to an optical transmitter in an optical transmission system, and has a DQPSK modulator 2 and an RZ modulator 3 equal to those illustrated in the above-described FIG. 18 (see reference signs 101 and 102).

The DQPSK modulator 2 has an outer Mach-Zehnder interferometer 2a optically connected to a light source 7 and inner Mach-Zehnder interferometers 2bi and 2bq formed on two arms 2ai and 2aq included in the outer Mach-Zehnder interferometer 2a. An electrode for optical modulation is formed on each of the inner Mach-Zehnder interferometers 2bi and 2bq.

That is, in the DQPSK modulator 2, binary phase modulation can be performed on each of the lights propagating through the inner Mach-Zehnder interferometers 2bi and 2bq, by driving electric signals supplied to the electrodes. Reference sign 2c represents a phase shifter that phase-shifts the light phase-modulated by the inner Mach-Zehnder interferometer 2bq, by π/2. A multiplexing waveguide 2am included in the outer Mach-Zehnder interferometer 2a multiplexes the optical signals phase-modulated through the arms 2ai and 2aq, and outputs the multiplexed signal as a DQPSK-modulated optical signal from the outer Mach-Zehnder interferometer 2a.

The driving electric signals supplied to the electrodes formed in the inner Mach-Zehnder interferometers 2bi and 2bq are derived from two data signals of, for example, 20 Gbps. These two data signals are waveform-shaped by waveform shapers 4-1 and 4-2, amplified by driver amplifiers 8-1 and 8-2, and then, supplied to the electrodes as the driving electric signals to the Mach-Zehnder interferometers 2bi and 2bq.

That is, the above-described DQPSK modulator 2 constitutes a multi-level phase modulator that generates a multi-level-phase-modulated (in this example, DQPSK-modulated) optical signal based on the two data signals waveform-shaped by the two waveform shapers 4-1 and 4-2 and outputs the generated signal. When the DQPSK modulation is performed based on the 20-Gps data signals as described above, since two-bit data can be modulated with one symbol, a 40-Gbps DQPSK-modulated optical signal can be output.

The RZ modulator (the first RZ modulator) 3 in the first embodiment has a Mach-Zehnder interferometer 3a connected so as to succeed the multiplexing waveguide 2am included in the DQPSK modulator 2, and an electrode for RZ optical modulation is formed on the Mach-Zehnder interferometer 3a. In the RZ modulator 3, the input DQPSK-modulated optical signal is RZ-optically-modulated by a driving electric signal constituting a clock signal of, for example, 20 GHz input from a clock signal source 6 through a driver amplifier 9, and is output as an RZ-DQPSK-modulated optical signal. The clock signal source 6 may be provided in a serializer included in the succeeding circuit.

The waveform shapers 4-1 and 4-2 waveform-shape the input two data signals in synchronism with the rising or falling timing based on comparison with the reference level of the input clock signal. The waveform shapers 4-1 and 4-2 may be each formed of a decision circuit (DEC) such as a D flip-flop (DFF). The data signals waveform-shaped by the waveform shapers 4-1 and 4-2 are amplified by the driver amplifiers 8-1 and 8-2, and supplied to the electrodes formed in the inner Mach-Zehnder interferometers 2bq and 2bi as the driving electric signals (signals for phase modulation), respectively.

Figure 2:
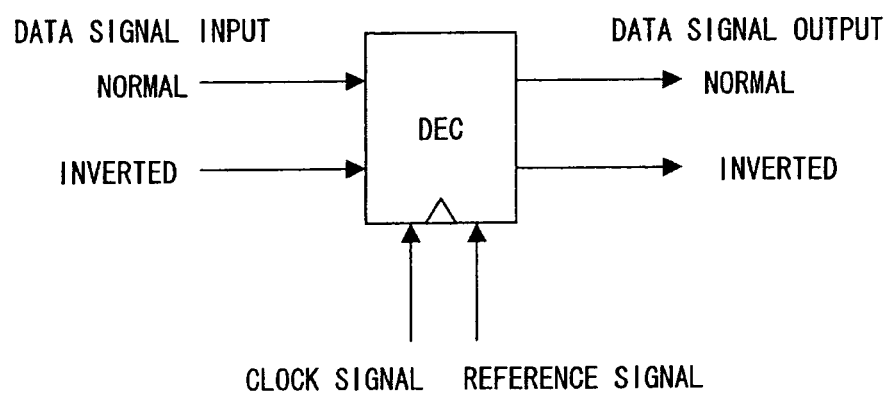
FIG. 2 illustrates an example of the structure of waveform shapers according to the first embodiment
Figure 3:
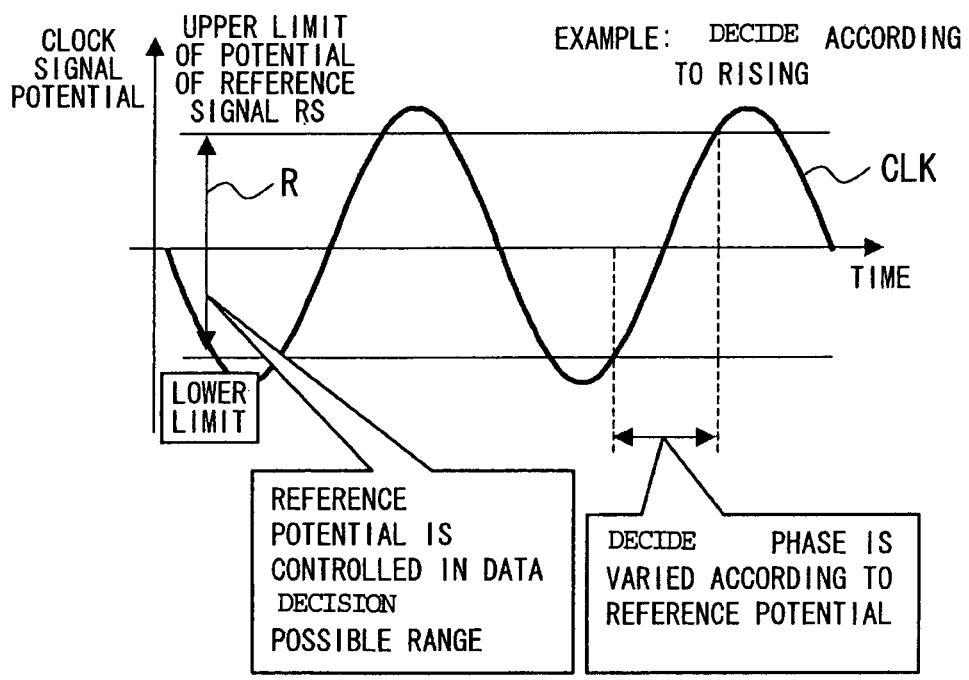
FIG. 3 illustrates operation of the waveform shapers according to the first embodiment.

FIG. 2 illustrates an example of the structure of the above-described waveform shapers 4-1 and 4-2. FIGS. 3 and 4 illustrates operation of the waveform shapers 4-1 and 4-2. While description will be given with respect to the waveform shaper 4-1 in the following, the structure and operation of the waveform shaper 4-2 can be described similarly.

As illustrated in FIG. 1 or 2, the waveform shaper 4-1 receives data signals of, for example, 20-Gbps as a normal signal and an inverted signal, receives a clock signal (for example, a sinusoidal wave) of, for example, 20-GHz from the clock signal source 6 and a reference signal (signal supplying the reference level) from multipliers 5c-1 and 5c-2 described later, decides whether the above-mentioned data signals are "1" or "0" in synchronism with the timing based on the clock signal and the reference signal, and outputs the result of the decision as the waveform-shaped data signals (a normal signal and an inverted signal).

For example, as illustrated in FIG. 3, in the waveform shaper 4-1, the data signals are decided according to the rising or falling timing of the input clock signal CLK. At this time, the potential of the reference signal RS is used to decide the rising or falling of the clock signal CLK. Specifically, for the decision of the data signals, the timing when the clock signal becomes higher than the potential of the reference signal is used as the rising timing of the clock signal, and the timing when the clock signal becomes lower than the potential of the reference signal is used as the falling timing of the clock signal.

Reference numbers 10 and 11 represent phase shifters. The phase shifters 10 and 11 apply a semi-fixed phase shift to the clock signal to the waveform shapers 4-1 and 4-2 and the clock signal to the RZ modulator 3, respectively, in order to initially compensate for the phase difference that occurs according to the difference among individual devices. As each of the phase shifters 10 and 11, a mechanical phase shifter (MPS) is used. The mechanical phase shifters 10 and 11 mechanically change the electrical length to thereby change the delay amount. Generally, the mechanical phase shifters are small in delay amount due to variations with time and variations in temperature, and are small in loss (up to 1 dB). The phase shifter 10 may be provided so as to correspond to each of the waveform shapers 4-1 and 4-2. The phase shifters 10 and 11 may be omitted by highly precisely designing the electric line length at the time of circuit design.

Further, in the first embodiment, as illustrated in FIG. 3, the phase determined by the waveform shaper 4-1 can be changed by changing the potential of the reference signal in a range where the data signal decision is possible. For example, as illustrated in FIG. 3, it is assumed that the data decision is possible in a range R where the relative level ratio of the reference signal potential as the reference level to the amplitude level of the clock signal is 10 to 90 percent. According to this assumption, by changing the potential of the reference signal in the range where the relative level ratio is 10 to 90 percent, the phase (output timing) of the data signal can be changed by approximately 15 ps. In other words, the output timing of the data signal to be supplied to the DQPSK modulator 2 can be adjusted by varying the potential of the reference signal.

FIGS. 4A to 4D are time charts illustrating an example in which the output timing of the waveform-shaped data signal is adjusted by changing the potential of the reference signal as described above in a case where the timing determined to be the rising of the clock signal is applied as the decision timing. A case is assumed where a data signal as illustrated in FIG. 4A and a clock signal as illustrated at CLK in FIG. 4B are input to the waveform shaper 4-1.

When the potential of the reference signal input to the waveform shaper 4-1 is an upper limit value (UL), data decision is performed in synchronism with timings t1 to t4 at the waveform shaper 4-1, so that a data signal output as illustrated in FIG. 4C is obtained. On the contrary, when the potential of the reference signal input to the waveform shaper 4-1 is a lower limit value (LL), data decision is performed in synchronism with timings t11 to t14 at the waveform shaper 4-1, so that a data output signal as illustrated in FIG. 4D is obtained.

By varying the potential of the reference signal between the upper limit value (UL) and the lower limit value (LL) in this manner, a delay variation range of the data signal output as illustrated at reference sign G in FIG. 4D is provided.

A level ratio controller 5 illustrated in FIG. 1 varies the relative level ratio of the potential of the reference signal (reference level) to the amplitude level of the clock signal input to the waveform shapers 4-1 and 4-2 based on the RZ-DQPSK optical signal output from the RZ modulator 3. The phase difference between the I and Q arms (1) and the phase difference between the data signal and the clock signal (2) that occur in the above-described case of FIG. 18 can be compensated by the relative level ratio varying by the level ratio controller 5.

For this, the level ratio controller 5 has an oscillation circuit 5a, a logic inverting circuit 5b, the multipliers 5c-1 and 5c-2, an optical coupler 5d, a photodiode 5e, a trans-impedance amplifier (TIA) 5f, a synchronous detector 5g, and a delay control circuit 5h. As illustrated in FIG. 1, a band-pass filter (BPF) 5i that extracts the component of a frequency f0 from the electric signal output from the TIA 5f may be interposed between the TIA 5f and the synchronous detector 5g.

The oscillation circuit 5a generates a signal of the predetermined frequency f0 (frequency signal f0). The frequency signal f0 generated by the oscillation circuit 5a is for varying the potential of the reference signal to search for the optimum setting of the delay time setting for compensating for the phase difference between the I and Q arms and the phase difference between the data signal and the clock signal. For example, the frequency signal f0 may be a sinusoidal signal having a frequency sufficiently lower than a frequency corresponding to the bit rate of the data signal, such as approximately several kHz to several MHz.

The multiplier 5c-1 multiplies the frequency signal f0 from the oscillation circuit 5a and the reference adjustment value from the delay control circuit 5f described later, and supplies the result to the waveform shaper 4-1 as the reference signal (reference level signal). The multiplier 5c-2 receives the frequency signal f0 generated by the oscillation circuit 5a through the logic inverting circuit 5b, multiplies the frequency signal f0 and the reference adjustment value from the delay control circuit 5f, and supplies the result to the waveform shaper 4-2 as the reference signal (reference level).

In response to a switching instruction from a switcher 5h-1 included in the delay control circuit 5h, the logic inverting circuit 5*b* non-inverts (normal) or inverts the phase of the frequency signal f0 from the oscillation circuit 5*a*, and outputs the normal or inverted signal to the multiplier 5*c*-2. That is, when the frequency signal f0 is inverted by the logic inverting circuit 5*b*, the phases of the frequency signals f0 input to the two multipliers 5*c*-1 and 5*c*-2 are inverted with respect to each other. When the frequency signal f0 is non-inverted by the logic inverting circuit 5*b*, the phases of the frequency signals f0 input to the two multipliers 5*c*-1 and 5*c*-2 are the same. Thus, the logic inverting circuit 5*b* is a signal inverter that inverts one of the signals of the predetermined frequency f0 supplied to the waveform shapers 4-1 and 4-2 through the superimposition on the reference level signal.

Figure 5A:
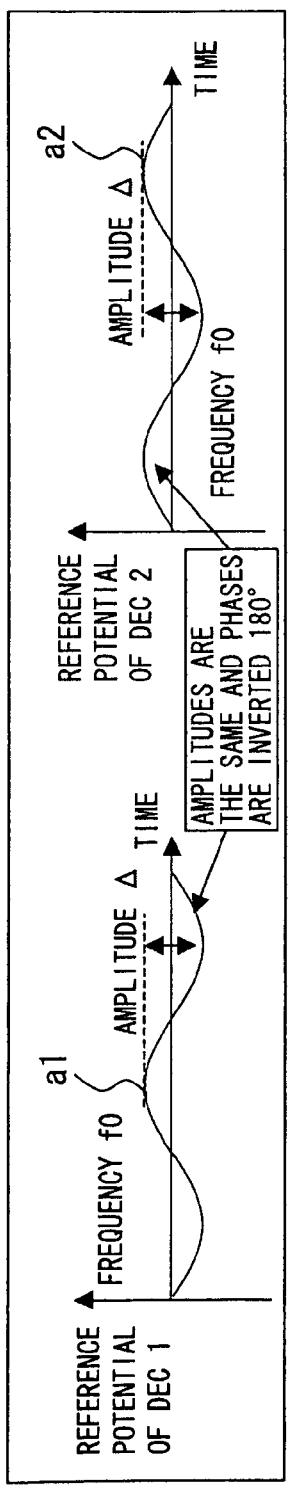
FIGS. 5A to 5C illustrate operation of the optical modulation device according to the first embodiment.
Figure 5B:
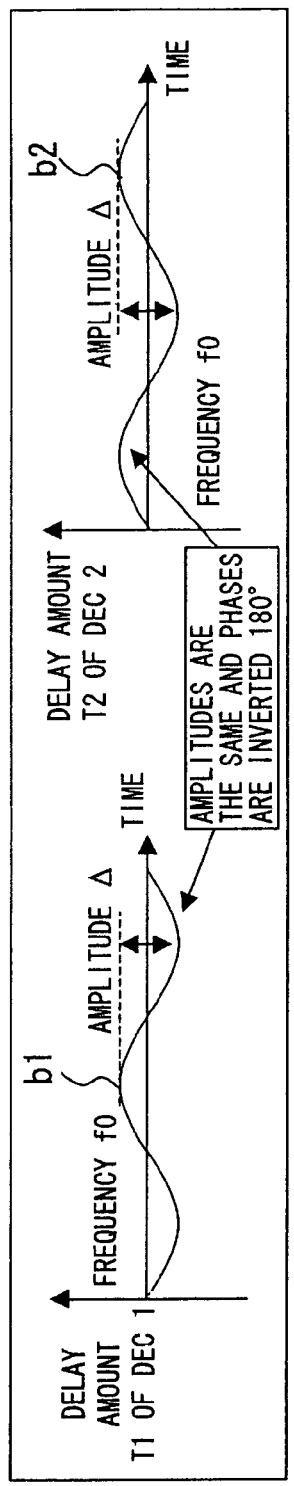
Figure 5C:
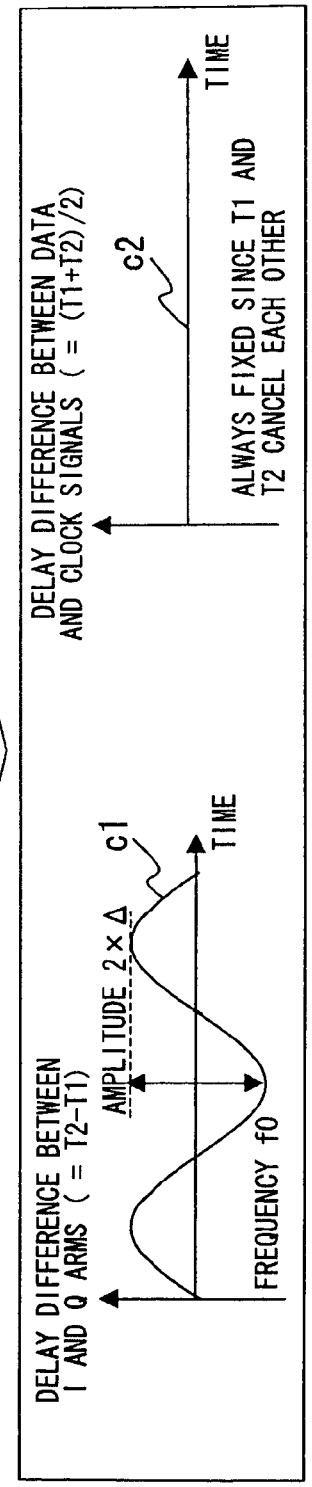

FIGS. 5A to 5C illustrate influences exerted on the modulations at the DQPSK modulator 2 and the RZ modulator 3 when the frequency signals f0 whose phases are inverted with respect to each other as described above at the logic inverting circuit 5*b* are supplied to the multipliers 5*c*-1 and 5*c*-2. FIGS. 6A to 6C illustrate influences exerted on the modulations at the DQPSK modulator 2 and the RZ modulator 3 when the frequency signals f0 whose phases are the same at the logic inverting circuit 5*b* are supplied to the multipliers 5*c*-1 and 5*c*-2.

As illustrated in FIG. 5A, the waveform shapers 4-1 and 4-2 receive, from the multipliers 5*c*-1 and 5*c*-2, reference signals a1 and a2 on which the components of the frequency signals f0 whose phases are inverted with respect to each other are superimposed. In the waveform shapers 4-1 and 4-2, when the reference signals a1 and a2 that vary according to the frequency signals f0 are input, the data signal decision timing also varies according to the variation.

Therefore, as illustrated in FIG. 5B, the output timings of data signals b1 and b2 output from the waveform shapers 4-1 and 4-2 also vary according to the variation of the reference signals a1 and a2. In other words, the data signals b1 and b2 output from the waveform shapers 4-1 and 4-2 are supplied with delay times T1 and T2 in the cycle of the frequency f0. Here, the amplitude Δ of the varying delay time is sufficiently smaller than the variation width (see R in FIG. 3) of the reference signal where the data signal decision is possible.

In the DQPSK modulator 2, phase modulation is performed based on the data signals b1 and b2 supplied with the delay times T1 and T2 varying in the cycle of the frequency f0 as described above. That is, in the Mach-Zehnder interferometer 2*bi* on the I arm 2*ai* included in the DQPSK modulator 2, phase modulation is performed based on the data signal b2, whereas in the Mach-Zehnder interferometer 2*bq* on the Q arm 2*aq*, phase modulation is performed based on the data signal b1. In the multiplexing waveguide 2*am*, the optical signals phase-modulated through the arms 2*ai* and 2*aq* are multiplexed, and output as the DQPSK-modulated optical signal.

At this time, since the difference in delay time between the optical signals which are phase-modulated lights propagating through the Mach-Zehnder interferometers 2*bi* and 2*bq*, that is, the phase difference between the I and Q arms corresponds to T2−T1 in FIG. 5B as illustrated at c1 in FIG. 5C, it varies according to the frequency f0 on the time axis.

On the other hand, since T1 and T2 cancel each other, the average [(T1+T2)/2] of the delay time differences due to the phase modulation at the Mach-Zehnder interferometers 2*bi* and 2*bq* included in the DQPSK modulator 2 is zero, and in the RZ modulator 3, since the clock signal from the clock signal source 6 is used for the RZ modulation without phase-shifted, the average of the delay time differences due to the RZ modulation is also zero.

Therefore, as illustrated at c2 in FIG. 5C, the phase difference between the data signal and the clock signal is always fixed since it is obtained from the difference between the average of the delay time differences due to the phase modulation at the DQPSK modulator 2 and the average of the delay time differences due to the RZ modulation at the RZ modulator 3.

That is, when an inverted signal is output from the logic inverting circuit 5*b*, frequency signals f0 whose phases are inverted with respect to each other can be supplied to the multipliers 5*c*-1 and 5*c*-2, so that only the phase difference between the I and Q arms can be extracted.

Moreover, as illustrated in FIG. 6A, the frequency signals f0 whose phases are the same at the logic inverting circuit 5*b* are supplied to the multipliers 5*c*-1 and 5*c*-2, whereby the reference signals a11 and a12 on which the components of the frequency signals f0 whose phases are the same are superimposed are input to the waveform shapers 4-1 and 4-2 from the multipliers 5*c*-1 and 5*c*-2.

As illustrated in FIG. 6B, the output timings of data signals b11 and b12 output from the waveform shapers 4-1 and 4-2 also vary according to the variations of the reference signals a11 and a12, and the delay amounts also vary according to the frequency f0 on the time axis [see T1 and T2 in FIG. 6B]. That is, in the Mach-Zehnder interferometer 2*bi* on the I arm 2*ai* included in the DQPSK modulator 2, phase modulation is performed based on the data signal b12, whereas in the Mach-Zehnder interferometer 2*bq* on the Q arm 2*aq*, phase modulation is performed based on the data signal b11.

At this time, with respect to the signals input to the waveform shapers 4-1 and 4-2, the frequency signals f0 multiplied at the multipliers 5*c*-1 and 5*c*-2 and the clock signals from the clock signal source 6 are common. Therefore, with respect to the lights propagating through the Mach-Zehnder interferometers 2*bq* and 2*bi*, the delay times T1 and T2 can be varied with the same phase, and the delay time difference (T2−T1) between the optical signals phase-modulated at the Mach-Zehnder interferometers 2*bi* and 2*bq*, that is, the phase difference between the I and Q arms can be made a fixed value 0 (T2−T1=0) on the time axis as illustrated at c11 in FIG. 6C.

On the other hand, when the average [(T1+T2)/2] of the delay time differences due to the phase modulations at the Mach-Zehnder interferometers 2*bi* and 2*bq* included in the DQPSK modulator 2 is obtained, the component of the frequency f0 is left. In the RZ modulator 3, since the clock signal from the clock signal source 6 is used for the RZ modulation without phase-shifted, the average of the delay time differences due to the RZ modulation is also zero.

Therefore, with respect to the phase difference between the data signal and the clock signal obtained from the difference between the average of the delay time differences due to the phase modulation at the DQPSK modulator 2 and the average of the delay time differences due to the RZ modulation at the RZ modulator 3, as illustrated at c12 in FIG. 6C, the component of the frequency f0 is left [(T1+T2)/2].

That is, when a normal signal is output from the logic inverting circuit 5*b*, since frequency signals f0 whose phases are the same can be supplied to the multipliers 5*c*-1 and 5*c*-2, only the phase difference between the data signal and the clock signal can be extracted.

Thus, the logic inverting circuit 5*b* and the multipliers 5*c*-1 and 5*c*-2 constitute a frequency component superimposer that superimposes the signal of the predetermined frequency f0 output from the oscillation circuit 5*a* on the reference level signal and supplies the signal to the waveform shapers 4-1 and 4-2. The frequency component superimposer and the oscillation circuit 5*a* constitute a varier that varies the relative level of the reference level to the amplitude level of the clock signal, according to the predetermined frequency.

The optical coupler 5d illustrated in FIG. 1 is a coupler that branches part of the optical signal output from the RZ modulator 3. The photodiode (PD) 5e is a optical receiver that receives the part of the optical signal branched by the optical coupler 5d and converts it into an electric signal (in this example, a current signal). As the optical coupler 5d and the photodiode 5e, a structure incorporated in a module constituting the RZ modulator 3 (or a module into which the DQPSK modulator 2 and the RZ modulator 3 are integrated) may be used.

The trans-impedance amplifier (TIA) 5f converts the current signal from the photodiode 5e into a voltage signal. However, this may be omitted if the electric signal output from the photodiode 5e is a voltage signal. The synchronous detector 5g extracts the component of the predetermined frequency f0 contained in the electric signal from the TIA 5f, by synchronous detection based on the signal of the predetermined frequency f0 from the oscillation circuit 5a.

Therefore, the optical coupler 5d, the photodiode 5e, the TIA 5f, and the synchronous detector 5g constitute an extractor that extracts the component of the predetermined frequency f0 from the optical signal output from the RZ modulator 3.

The delay control circuit 5h adjusts the potential of the reference signal supplied to each of the waveform shapers 4-1 and 4-2 in order to compensate for the phase difference between the I and Q arms and the phase difference between the data signal and the clock signal. The delay control circuit 5h has the switcher 5h-1 and an adjuster 5h-2.

The switcher 5h-1 switches between inversion and non-inversion of the signal of the predetermined frequency f0 at the logic inverting circuit 5b. The adjuster 5h-2 adjusts the median value of the relative level ratio of the reference signal to the amplitude level of the clock signal which is periodically varied through the superimposition of the frequency signal f0 at the multipliers 5c-1 and 5c-2 constituting the varier, based on the component of the predetermined frequency f0 extracted by the synchronous detector 5g constituting the extractor.

Specifically, by outputting, as the voltage signal, a reference adjustment value that determines the median value of the relative level ratio, a reference signal adjusted so that the component of the predetermined frequency f0 extracted by the synchronous detector 5g is minimum can be supplied to each of the waveform shapers 4-1 and 4-2. In other words, the median value of the relative level ratio of the reference signal is the ratio of the reference adjustment value to the amplitude level of the clock signal.

That is, by the switching at the switcher 5h-1, the frequency signal f0 from the oscillation circuit 5a is inverted and output from the logic inverting circuit 5b. The adjuster 5h-2 can adjust the reference signals supplied to the waveform shapers 4-1 and 4-2 in order to compensate for the phase difference between the I and Q arms. Moreover, by the switching at the switcher 5h-1, the frequency signal f0 from the oscillation circuit 5a is non-inverted and output (as it is) from the logic inverting circuit 5b, whereby the adjuster 5h-2 can adjust the reference signals supplied to the waveform shapers 4-1 and 4-2 in order to compensate for the phase difference between the data signal and the clock signal.

Figure 7A:
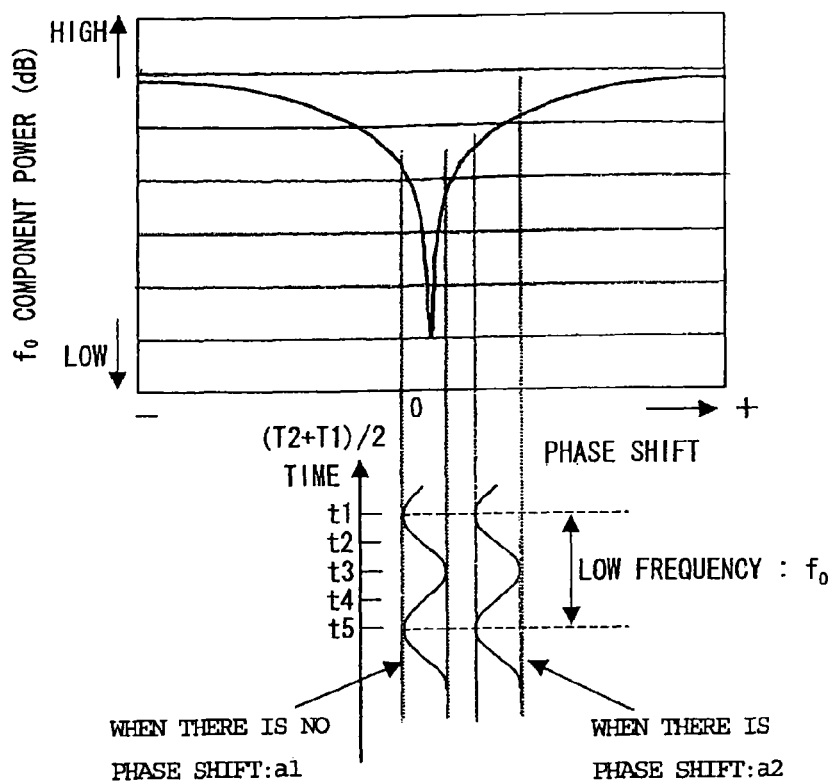
FIGS. 7A to 7C illustrate operation of the optical modulation device according to the first embodiment.
Figure 7B:
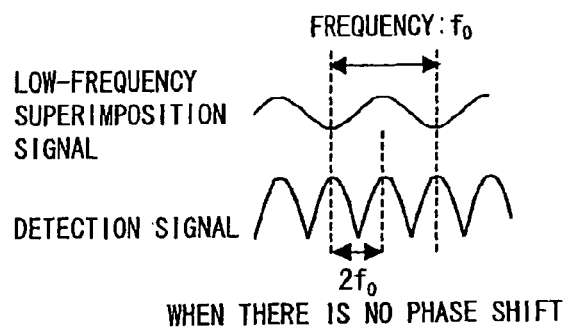
Figure 7C:
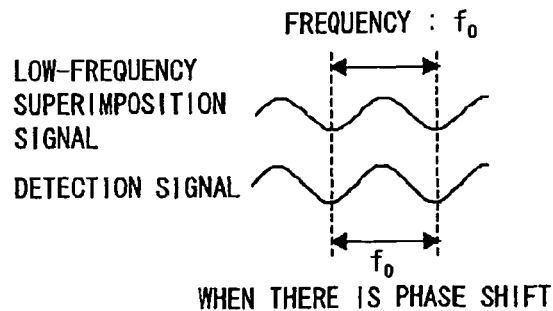

FIGS. 7A to 7C illustrate the principle of the reference signal adjustment by the adjuster 5h-2. When the frequency signals f0 whose phases are the same are superimposed on the reference signals to the waveform shapers 4-1 and 4-2, as illustrated in FIG. 7A, the power of the component of the frequency f0 from the synchronous detector 5g is minimum when the phase difference between the data signal and the clock signal is zero. The component of the frequency f0 increases as the value of the phase difference between the data signal and the clock signal increases or decreases from zero.

The phase difference between the data signal and the clock signal is obtained by the difference [(T1+T2)/2] between the average of the delay times T1 and T2 (see FIG. 6B) of the data signals output from the waveform shapers 4-1 and 4-2 and the average [0] of the delay time differences due to the RZ modulation at the RZ modulator 3. The delay times T1 and T2 of the data signals output from the waveform shapers 4-1 and 4-2 correspond to the relative level ratios of the levels of the reference signals to the amplitude levels of the clock signals input to the waveform shapers 4-1 and 4-2.

Therefore, as illustrated in FIG. 7A, since the frequency signals f0 are superimposed on the reference signals input to the waveform shapers 4-1 and 4-2, by varying the relative level ratios thereof, the value of the phase difference between the data signal and the clock signal can also be varied on the time axis (t1 to t5).

At this time, when the reference adjustment values output from the adjuster 5h-2 to the multipliers 5c-1 and 5c-2 are appropriate, as illustrated at a1 in FIG. 7A, the phase difference between the data signal and the clock signal periodically varies so as to cross the point of the phase difference which is the minimum point of the component of the frequency f0. Consequently, since the power of the component of the frequency f0 extracted by the synchronous detector 5g also periodically varies so as to cross the minimum point, as illustrated in FIG. 7B, the frequency component twice the f0 component is dominant on the time axis, and the f0 component is ideally zero.

On the contrary, when the reference adjustment values output from the adjuster 5h-2 to the multipliers 5c-1 and 5c-2 are not appropriate, as illustrated at a2 in FIG. 7A, the phase difference between the data signal and the clock signal periodically varies without crossing the point of the phase difference which is the minimum point of the component of the frequency f0. Consequently, since the power of the component of the frequency f0 extracted by the synchronous detector 5g also periodically varies without crossing the minimum point, as illustrated in FIG. 7C, the frequency component of the f0 component is dominant on the time axis.

As described above, at the adjuster 5h-2, by adjusting the reference adjustment values to the multipliers 5c-1 and 5c-2 so that the component of the frequency f0 extracted by the synchronous detector 5g is minimum (0), the phase difference between the data signal and the clock signal can be compensated optimally.

When the frequency signals f0 whose phases are opposite to each other are superimposed on the reference signals to the waveform shapers 4-1 and 4-2, as in the case of the component of the frequency f0 with respect to the phase difference between the data signal and the clock signal [see FIG. 7A], the power of the component of the frequency f0 from the synchronous detector 5g with respect to the phase difference (T2−T1) between the I and Q arms is minimum when the phase difference (T2−T1) between the I and Q arms is zero and the component of the frequency f0 increases as the value of the phase difference between the I and Q arms increases or decreases from zero.

Therefore, similarly to FIGS. 7B and 7C, at the adjuster 5h-2, by adjusting the reference adjustment values to the multipliers 5c-1 and 5c-2 so that the component of the frequency f0 extracted by the synchronous detector 5g is minimum (0), the phase difference between the I and Q arms can be compensated optimally.

Figure 8:
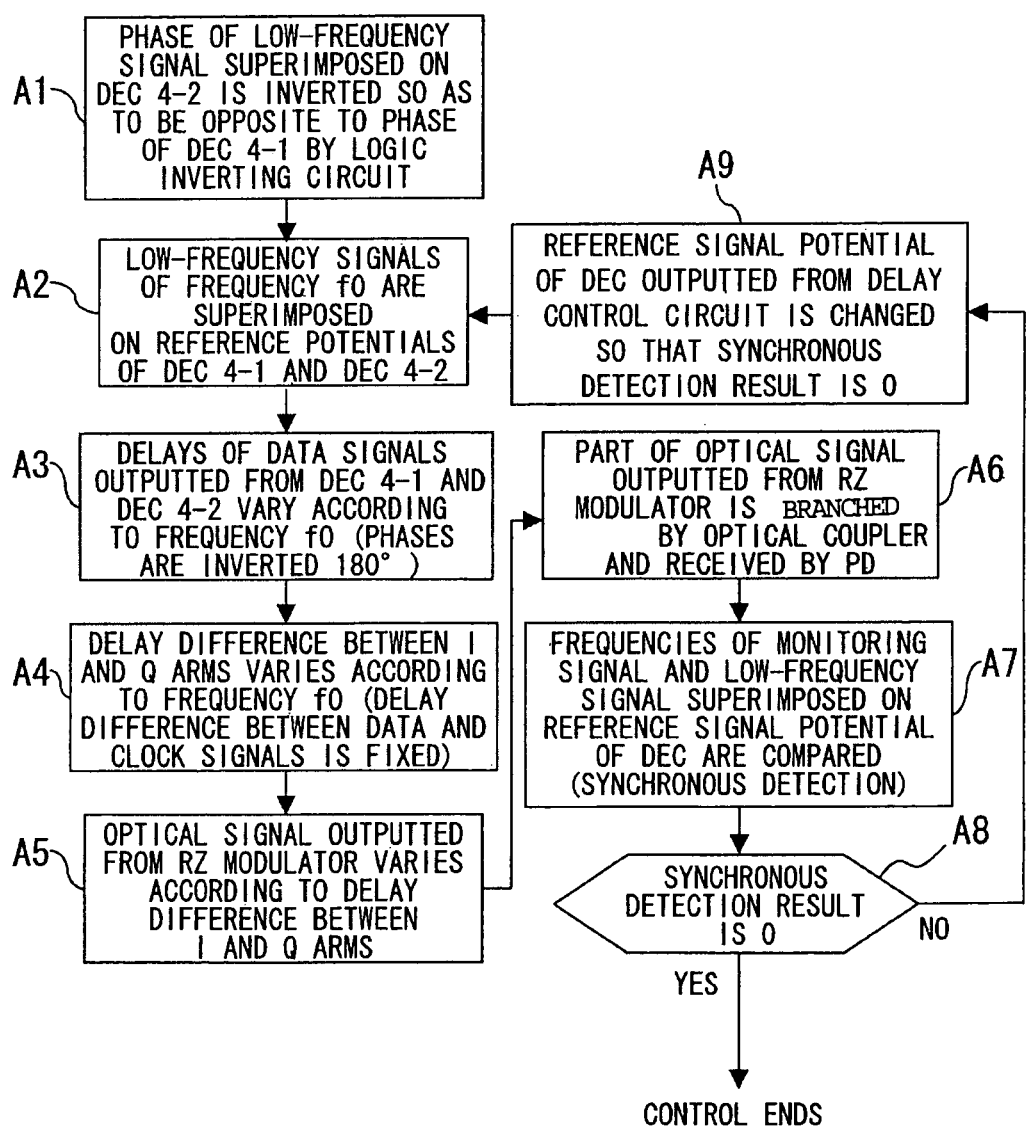
FIG. 8 illustrates operation when the phase difference between the I and Q arms is compensated in the optical modulation device 1 according to the first embodiment.

Operation when the phase difference between the I and Q arms is compensated in the optical modulation device 1 structured as described above will be described by using the flowchart illustrated in FIG. 8. The phase of the frequency signal f0 superimposed on the waveform shaper (DEC) 4-2 is inverted by the logic inverting circuit 5b so as to be opposite to the phase of the frequency signal f0 to the waveform shaper (DEC) 4-1, through the switching by the switcher 5h-1 (operation A1 of FIG. 8).

Then, the multipliers 5c-1 and 5c-2 multiply the reference adjustment values by the frequency signals f0 whose phases are inverted with respect to each other, and output the results as the reference signals to the waveform shapers 4-1 and 4-2. Thereby, the signals of the frequency f0 are superimposed on the reference signals of the waveform shapers 4-1 and 4-2 (operation A2).

Since the reference signals on which the frequency signals f0 whose phases are inverted with respect to each other are superimposed are input to the waveform shapers 4-1 and 4-2 as described above, as illustrated in FIG. 5B, the delay times of the data signals output from the waveform shapers 4-1 and 4-2 vary according to the frequency f0 (operation A3).

At this time, as illustrated at c1 in FIG. 5C, the difference in delay time between the optical signals which are phase-modulated lights propagating through the Mach-Zehnder interferometers 2bi and 2bq, that is, the phase difference between the I and Q arms varies according to the frequency f0 on the time axis since it corresponds to T2−T1 in FIG. 5B (operation A4). On the other hand, the phase difference between the data signal and the clock signal is always a fixed value 0 since it is obtained from the difference between the average of the delay time differences due to the phase modulation at the DQPSK modulator 2 and the average of the delay time differences due to the RZ modulation at the RZ modulator 3.

That is, by outputting an inverted signal at the logic inverting circuit 5b and supplying the frequency signals f0 whose phases are inverted with respect to each other to the multipliers 5c-1 and 5c-2, the optical signal output from the RZ modulator 3 can be varied according to the phase difference (delay difference) between and I and Q arms (operation A5).

Then, part of the output of the RZ modulator 3 is branched by the optical coupler 5d, and the branched optical signal is received by the photodiode 5e (operation A6). Further, the synchronous detector 5g receives a monitoring signal from the photodiode 5e, and receives the frequency signal f0 superimposed on the reference signals of the waveform shapers 4-1 and 4-2, from the oscillation circuit 5a. By comparing the frequency of the monitoring signal and that of the frequency signal f0 from the oscillation circuit 5a, the synchronous detector 5g performs synchronous detection, and extracts the component of the frequency f0 contained in the monitoring signal (operation A7).

At the adjuster 5h-2 included in the delay control circuit 5h, the reference adjustment values (reference potentials) from which the reference signals at the waveform shapers 4-1 and 4-2 are derived are changed until the component of the frequency f0 extracted by the synchronous detector 5g becomes minimum (0) (until the phase difference between the I and Q arms becomes optimum) (operation A9 from the No route of operation A8). Thereafter, when the component of the frequency f0 extracted by the synchronous detector 5g becomes minimum, the reference adjustment value change control ends (the YES route of operation A8).

Figure 9:
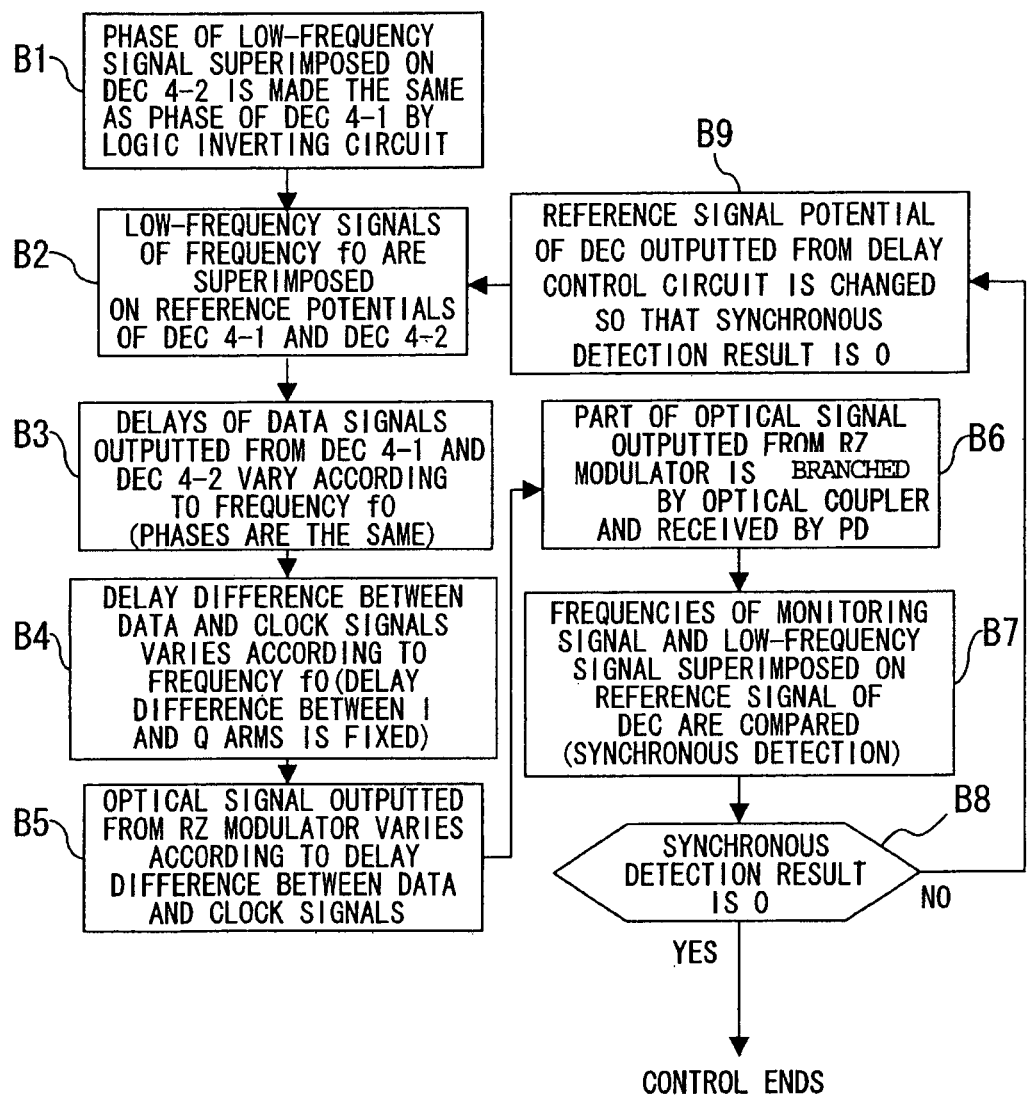
FIG. 9 illustrates operation when the phase difference between the data signal and the clock signal is compensated in the optical modulation device 1 according to the first embodiment.

When the phase difference between the data signal and the clock signal is compensated, as illustrated in FIG. 9, the phase of the frequency signal f0 superimposed on the waveform shaper (DEC) 4-2 is made the same as the phase of the frequency signal f0 to the waveform shaper (DEC) 4-1 by the logic inverting circuit 5b through the switching by the switcher 5h-1 (operation B1).

Then, the multipliers 5c-1 and 5c-2 multiply the reference adjustment values from the adjuster 5h-2 by the frequency signals f0 whose phases are the same, and output the results as the reference signals to the waveform shapers 4-1 and 4-2. Thereby, the signals of the frequency f0 are superimposed on the reference signals of the waveform shapers 4-1 and 4-2 (operation B2).

Since the reference signals on which the frequency signals f0 whose phases are the same are superimposed are input to the waveform shapers 4-1 and 4-2 as described above, as illustrated in FIG. 6B, the delay times of the data signals output from the waveform shapers 4-1 and 4-2 vary according to the frequency f0, and the phases of the delay time difference variations are the same [b11 and b12 in FIG. 6B, operation B3].

At this time, as illustrated at c11 in FIG. 6C, the difference in delay time between the optical signals which are phase-modulated lights propagating through the Mach-Zehnder interferometers 2bi and 2bq, that is, the phase difference between the I and Q arms is a fixed value 0 on the time axis since it corresponds to T2−T1 in FIG. 6B. On the other hand, the phase difference between the data signal and the clock signal varies according to the frequency f0 since it is obtained from the difference between the average [(T2+T1)/2] of the delay time differences due to the phase modulation at the DQPSK modulator 2 and the average (0) of the delay time differences due to the RZ modulation at the RZ modulator 3 (operation B4).

That is, by supplying the frequency signals f0 whose phases are the same to the multipliers 5c-1 and 5c-2, the optical signal output from the RZ modulator 3 can be varied according to the phase difference between the data signal and the clock signal (delay difference) (operation B5).

Then, part of the output of the RZ modulator 3 is branched by the optical coupler 5d, and the branched optical signal is received by the photodiode 5e (operation B6). Further, the synchronous detector 5g receives a monitoring signal from the photodiode 5e, and receives the frequency signal f0 superimposed on the reference signals of the waveform shapers 4-1 and 4-2, from the oscillation circuit 5a. By comparing the frequency of the monitoring signal and that of the frequency signal f0 from the oscillation circuit 5a, the synchronous detector 5g performs synchronous detection. Then, the synchronous detector 5g extracts the component of the frequency f0 contained in the monitoring signal (operation B7).

At the adjuster 5h-2 included in the delay control circuit 5h, the reference adjustment values (reference potentials) from which the reference signals of the waveform shapers 4-1 and 4-2 are derived are changed until the component of the frequency f0 extracted by the synchronous detector 5g becomes minimum (0) (until the phase difference between the data signal and the clock signal becomes optimum) (operation B9 from the No route of operation B8). Thereafter, when the component of the frequency f0 extracted by the synchronous detector 5g becomes minimum, the reference adjustment value change control ends (the YES route of operation B8).

As described above, according to the optical modulation device 1 of the first embodiment, the level ratio controller 5 is provided that varies the relative level ratio of the reference level to the amplitude level of the clock signal input to the plurality of waveform shapers based on the optical signal output from the DQPSK modulator 2. Even when a phase shift occurs among parts of the circuit included in the optical modulation device 1 because the phase delay amount in the circuit is changed due to variations in temperature or variations with time, the shift can be compensated adaptively. Consequently, the phase difference can be easily and highly accurately compensated irrespective of characteristics of variations with time and variations among individuals.

Figure 10:
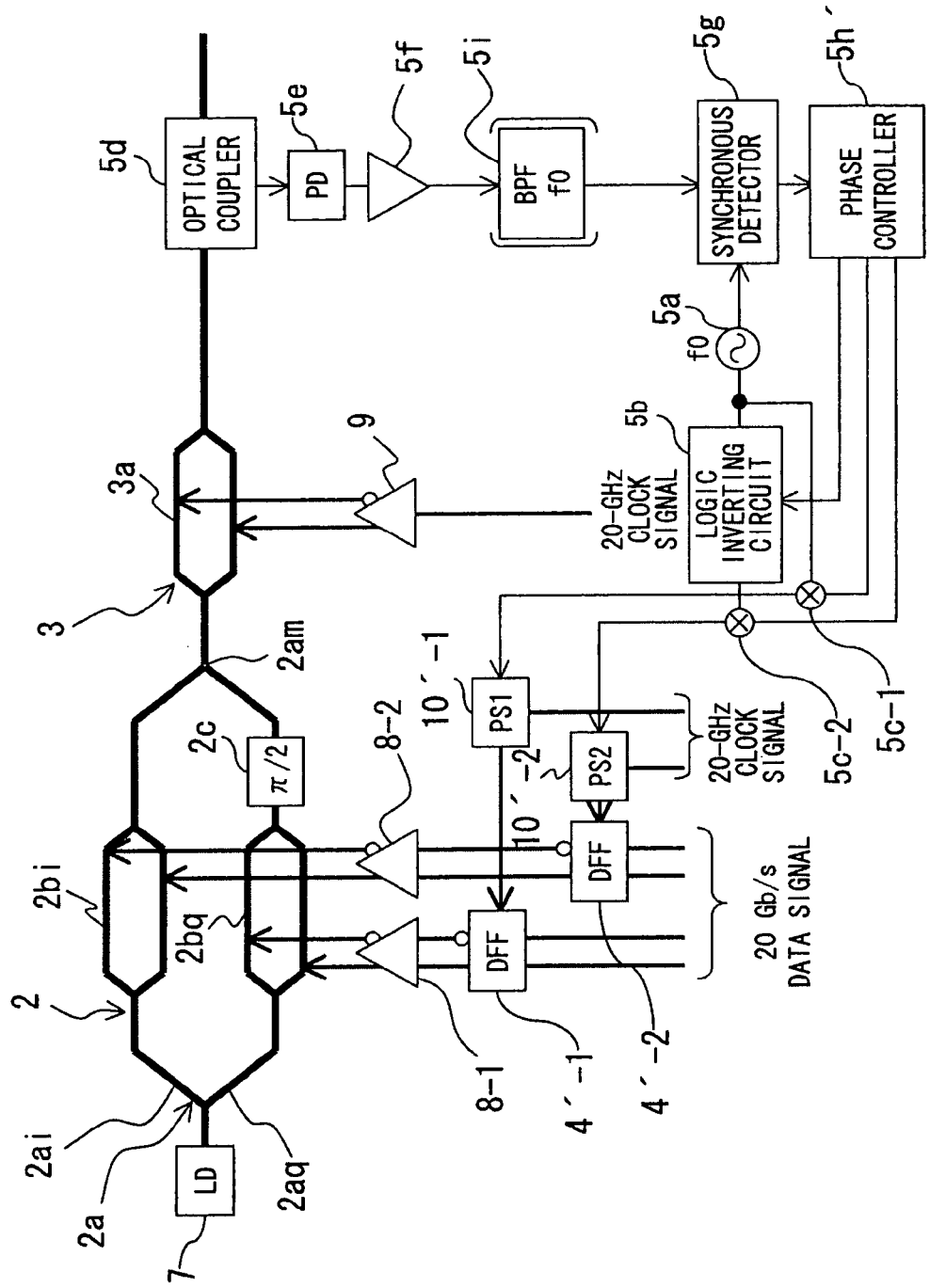
FIG. 10 illustrates a comparative example of the structure illustrating operation of the optical modulation device according to the first embodiment.

In this regard, as illustrated in FIG. 10, phase shifters 10'-1 and 10'-2 are provided that directly vary the phase of the clock signal determining the output timing of the data signals at DFFs 4'-1 and 4'-2 instead of superimposing the frequency signals f0 on the reference signals at the waveform shapers 4-1 and 4-2 illustrated in the first embodiment. A structure is considered that controls the delay of the data signals to drive the DQPSK modulator 2 and the clock signal to drive the RZ modulator 3. That is, the frequency signal f0 is superimposed on the control signal for controlling the phase shift amount for the phase shifters 10'-1 and 10'-2, and the phase shifters 10'-1 and 10'-2 are controlled so that the delay difference is optimum by a phase controller 5$h'$ by using the component of the frequency signal f0 extracted from the monitoring light which is the output of the RZ modulator 3. In FIG. 10, reference numbers the same as those of FIG. 1 represent similar parts.

However, in the structure illustrated in FIG. 10, electric circuit type phase shifters that can be driven by a voltage are applied as the phase shifters 10'-1 and 10'-2 that control the delay. Since the electric circuit type phase shifters are generally large in loss (>4 dB), it is necessary to add an amplifier or the like to compensate for the loss, which increases the number of parts of the circuit to increase power consumption and cost.

On the contrary, in the optical modulation device 1 according to the first embodiment, the delay difference between the signals can be compensated without the use of the electric circuit type phase shifters as illustrated in FIG. 10, so that the increase in the number of parts of the circuit and consequently, the increase in power consumption and cost can be suppressed.

Figure 11:
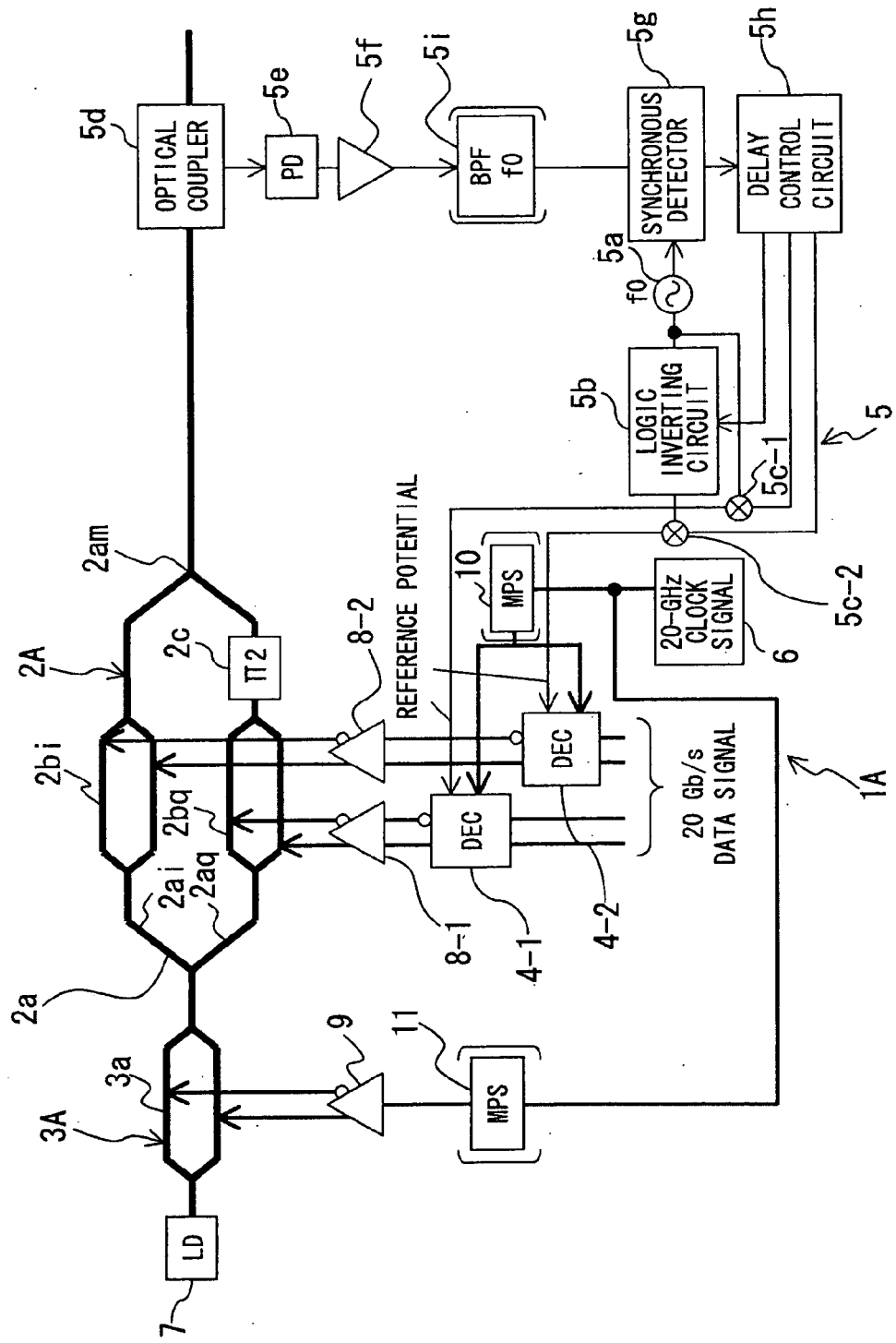
FIG. 11 illustrates an optical modulation device according to a second embodiment.

FIG. 11 is a view showing an optical modulation device 1A according to the second embodiment. Unlike in the case of the above-described first embodiment, in the optical modulation device 1A illustrated in FIG. 11, the order of arrangement of an RZ modulator 3A and a DQPSK modulator 2A in the light propagation direction is opposite to that in the case of the first embodiment. That is, the RZ modulator 3A is a second RZ modulator that generates a second RZ optical signal RZ-modulated based on the clock signal from the clock signal source 6, and outputs the generated signal. The RZ modulator 3A has the Mach-Zehnder interferometer 3$a$ connected to the light source 7, and a non-illustrated electrode for the RZ optical modulation is formed on the Mach-Zehnder interferometer 3$a$. The DQPSK modulator 2A generates a DQPSK-modulated optical signal (RZ-DQPSK-modulated optical signal) from the second RZ optical signal from the RZ modulator 3A, and outputs the generated signal.

In this case, the optical coupler 5$d$, the photodiode 5$e$, the TIA 5$f$, and the synchronous detector 5$g$ constitute an extractor that extracts the component of the predetermined frequency f0 from the optical signal output from the DQPSK modulator 2A. The structures other than the above-described structure are basically the same as those illustrated in FIG. 11. In FIG. 11, reference numbers the same as those of FIG. 1 represent similar parts.

Thus, in the optical modulation device 1A according to the second embodiment, similar advantages as those of the above-described first embodiment are obtained.

Figure 12:
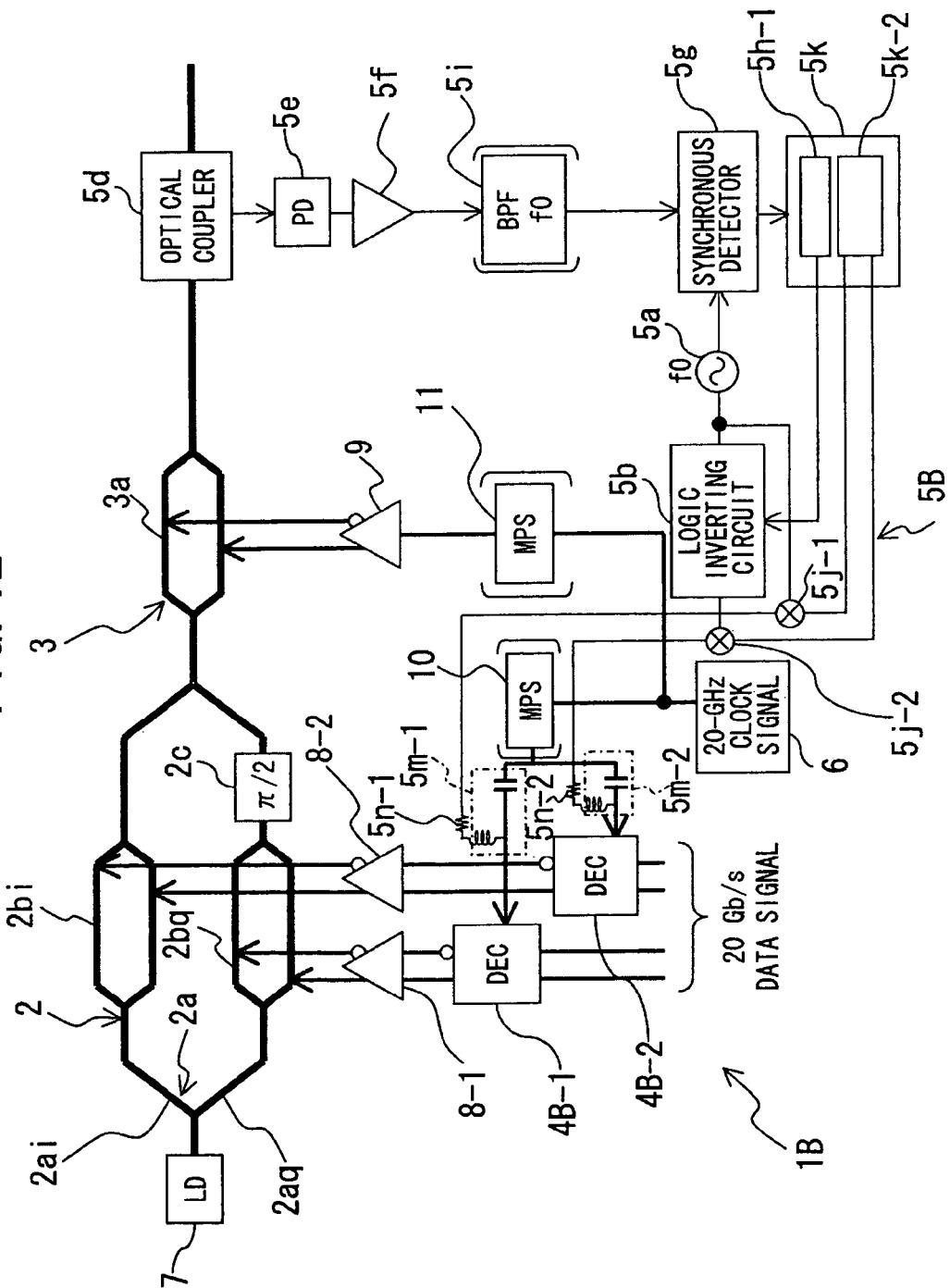
FIG. 12 illustrates an optical modulation device according to a third embodiment.

FIG. 12 illustrates an optical modulation device 1B according to the third embodiment. Compared with the optical modulation device 1 in the above-described first embodiment, the optical modulation device 1B illustrated in FIG. 12 is different in the structure as a level ratio controller 5B. The other structures are basically similar to those of the first embodiment. In FIG. 12, reference numbers the same as those of FIG. 1 represent similar parts.

Here, the level ratio controller 5B in the optical modulation device 1B has waveform shapers 4B-1 and 4B-2, multipliers 5$j$-1 and 5$j$-2, and a delay control circuit 5$k$ different from those of the first embodiment, and also has bias-T circuits 5$m$-1 and 5$m$-2 and resistors 5$n$-1 and 5$n$-2.

The waveform shapers 4B-1 and 4B-2 output, like the ones in the above-described first embodiment (see reference numbers 4-1 and 4-2 in FIG. 1), waveform-shaped data signals in synchronism with the rising or falling timing based on comparison with the reference level of the input clock signal. Unlike in the case of the first embodiment, the reference level is fixed at "0", and a clock signal whose intercept value is adjusted is input. That is, in the waveform shapers 4B-1 and 4B-2 in the third embodiment, the relative level ratio of the reference level to the amplitude level of the clock signal can be varied by receiving the DC-coupled clock signal whose direct current (DC) level is adjusted.

For this, the delay control circuit 5$k$ has the switcher 5$h$-1 similar to that of the first embodiment, and has an adjuster 5$k$-2. The adjuster 5$k$-2 outputs the adjustment values of the DC level of the clock signals to the waveform shapers 4B-1 and 4B-2 so that the component of the frequency f0 extracted by the synchronous detector 5$g$ included in the extractor is minimum.

The multiplier 5$j$-1 multiplies the frequency signal f0 from the oscillation circuit 5$a$ and the DC level adjustment value from the adjuster 5$k$-2 to the waveform shaper 4B-1. Further, the multiplier 5$j$-2 multiplies the frequency signal f0 from the logic inverting circuit 5$b$ whose operating state is switched by the switcher 5$h$-1 and the DC level adjustment value from the adjuster 5$k$-2 to the waveform shaper 4B-2, and outputs the result as an DC level signal.

The bias-T circuits 5$m$-1 and 5$m$-2 superimpose the intercept component signals from the multipliers 5$j$-1 and 5$j$-2 on the clock signals input from the clock signal source 6.

In the waveform shapers 4B-1 and 4B-2, the data signals are decided according to the rising or falling timing of the input clock signals CLK. Specifically, the reference potential fixed at "0" is used to decide the rising or falling of the clock signals CLK. At this time, for example as illustrated in FIG. 13, since the waveforms of the clock signals rise and fall by the DC level signals of the clock signals input through the multipliers 5$j$-1 and 5$j$-2 and the bias-T circuits 5$m$-1 and 5$m$-2, the timing of the rising (or the falling) with respect to the reference potential can be adjusted before and after on the time axis according to the DC levels of the waveforms of the clock signals.

Figure 13:
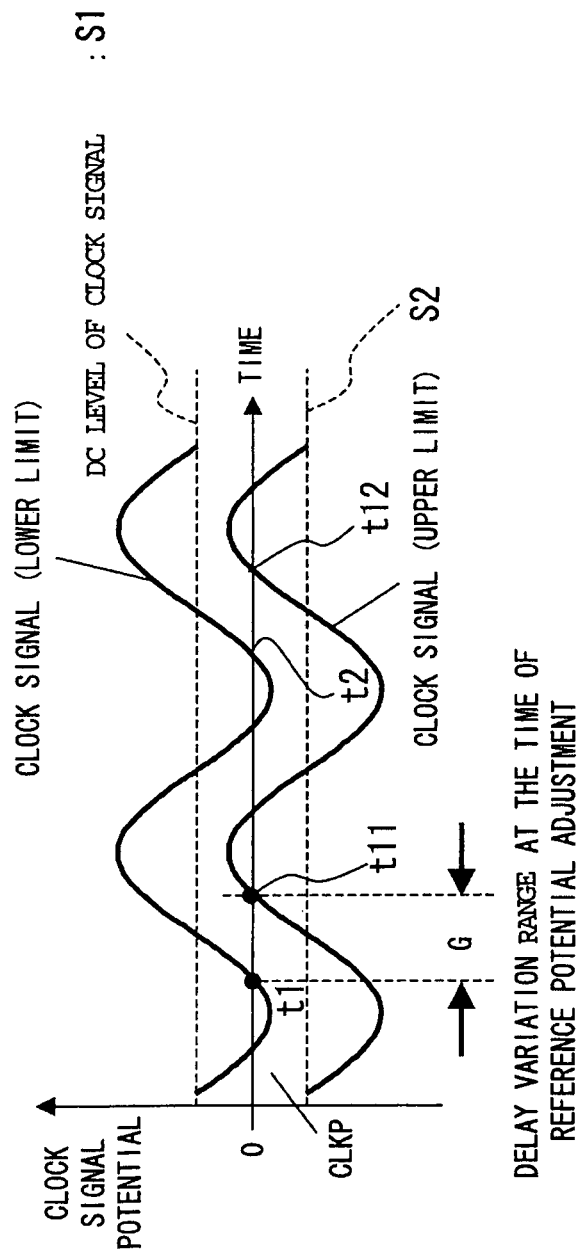
FIG. 13 illustrates operation of the optical modulation device according to the third embodiment.

For example, as illustrated in FIG. 13, by the DC level (S1) being an upper value higher than 0, the rising timing of the clock signal a1 based on the reference potential "0" can be made the time points t1 and t2. On the other hand, by the DC level being a lower limit lower than 0 (S2), the rising timing of the clock signal a2 based on the reference potential "0" can be made the time points t11 and t12. As illustrated in FIG. 13, by varying the DC level between S1 and S2, the output timings of the data signals from the waveform shapers 4B-1 and 4B-2 can be varied within the range G in the figure.

In the third embodiment, the DC level of the clock signal can also be made to rise and fall according to the frequency f0 based on the frequency signal f0 generated by the oscillation circuit 5a. Thus, the oscillation circuit 5a, the logic inverting circuit 5b, the multipliers 5j-1 and 5j-2, the bias-T circuits 5m-1 and 5m-2, and the resistors 5n-1 and 5n-2 constitute a varier that varies the relative level ratio of the reference level (reference potential) to the amplitude level of the clock signal according to the predetermined frequency f0.

The adjuster 5k-2 outputs the adjustment values of the DC levels of the clock signals to the waveform shapers 4B-1 and 4B-2 so that the component of the frequency f0 extracted by the synchronous detector 5g included in the extractor is minimum (0). In other words, the adjustment values of the DC level output by the adjuster 5h-2 determine the median of the relative level ratio that periodically varies according to the frequency f0.

In the optical modulation device 1B structured as described above, when the phase difference between the I and Q arms is compensated, the phase of the frequency signal f0 superimposed on the waveform shaper (DEC) 4B-2 is also inverted by the logic inverting circuit 5b so as to be opposite to the phase of the frequency signal f0 to the waveform shaper (DEC) 4B-1 through the switching by the switcher 5h-1. When the phase difference between the data signal and the clock signal is compensated, the phase of the frequency signal f0 superimposed on the waveform shaper (DEC) 4-2 is also made the same as the phase of the frequency signal f0 to the waveform shaper (DEC) 4-1 by the logic inverting circuit 5b through the switching by the switcher 5h-1.

By adjusting the DC levels of the clock signals to the waveform shapers 4B-1 and 4B-2 so that the component of the frequency f0 extracted by the synchronous detector 5g is minimum (0) by the adjuster 5j-2, the phase difference between the I and Q arms or the phase difference between the data signal and the clock signal can be compensated optimally.

As described above, in the third embodiment, similar advantages as those of the above-described first embodiment are obtained.

While the level ratio controller 5B according to the third embodiment adjusts the DC level of the clock signal to thereby adjust the median of the relative level ratio that varies according to the frequency f0, the mode that adjusts the median of the relative level ratio is not limited to the mode illustrated in FIG. 12.

Figure 14:
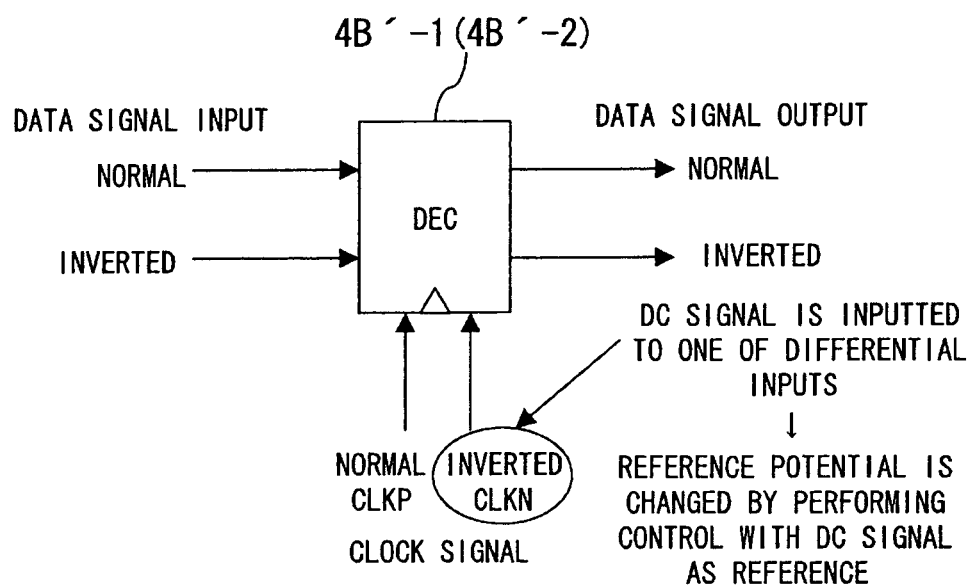
FIG. 14 illustrates an example of the structure of the waveform shapers in an example of the third embodiment.

For example, like the waveform shaper 4B'-1 (4B'-2) illustrated in FIG. 14, as the reference potential for deciding the rising or the falling of the clock signal that determines the decision timing, the potential "0" is used as in the case of FIG. 12. On the other hand, the clock signal input is normal (CLKP) and inverted (CLKN) differential inputs, the clock signal (alternating current component) from the clock signal source 6 is input as the normal input of the clock signal, and the DC level signal from the multiplier 5j-1 (5j-2) is input as the inverted input. Therefore, for example as illustrated in FIG. 15, the output timing of the data signal as the waveform shaper 4B'-1 (4B'-2) can be adjusted.

Figure 15:
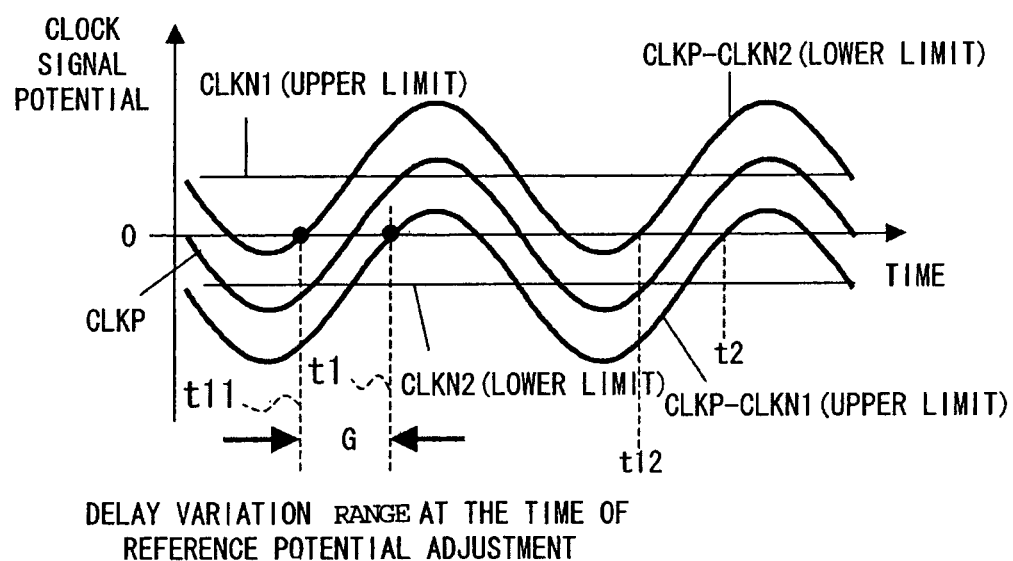
FIG. 15 illustrates operation of the optical modulation device in an example of the third embodiment.

That is, as illustrated in FIG. 15, by the upper limit being the DC level (CLKN1) input in inverted state, the rising timing of the clock signal (CLKP-CLKN1) based on the reference potential "0" can be made the time points t1 and t2. On the other hand, by the DC level being a lower limit (CLKN2) lower than 0, the rising timing of the clock signal (CLKP-CLKN2) based on the reference potential "0" can be made the time points t11 and t12. As illustrated in FIG. 14, by varying the DC level input in inverted state, in the range of the CLKN 1 and the CLKN 2, the output timing of the data signals from the waveform shapers 4B'-1 and 4B'-2 can be varied within the range G in the figure.

Moreover, as in the case of the above-described second embodiment, the order of arrangement of the RZ modulator and the DQPSK modulator in the light propagation direction may be opposite.

The present invention is not limited to the above-described embodiments, and may be modified in various ways without departing from the spirit of the invention.

Figure 16:
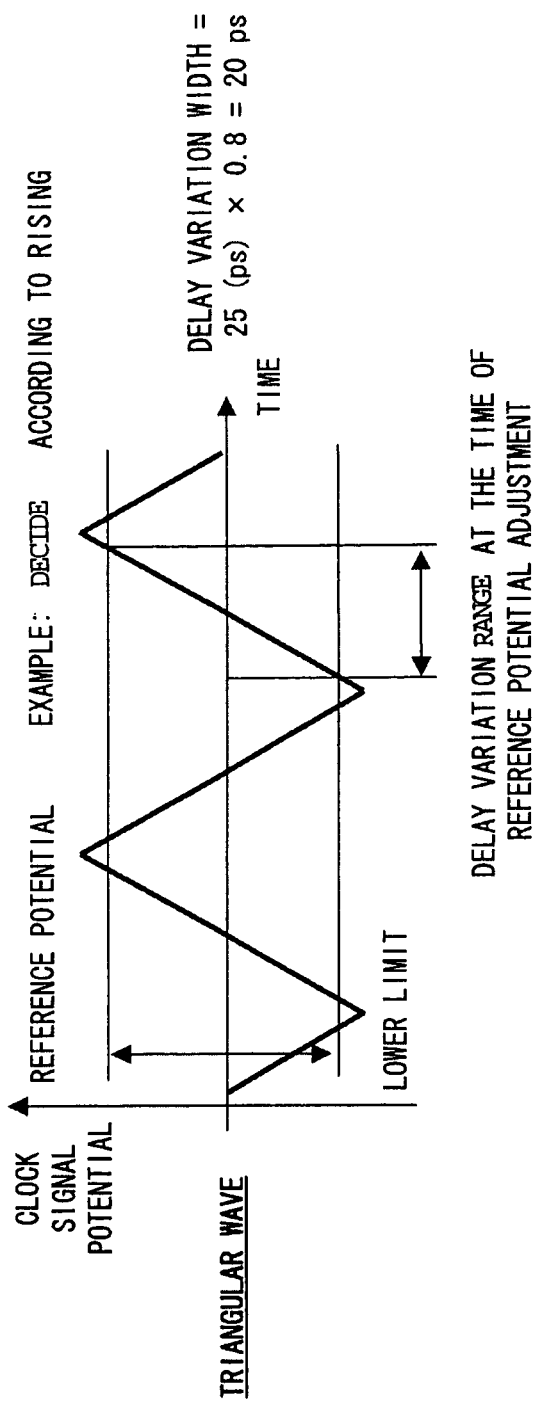
FIG. 16 illustrates an example of the embodiments.
Figure 17:
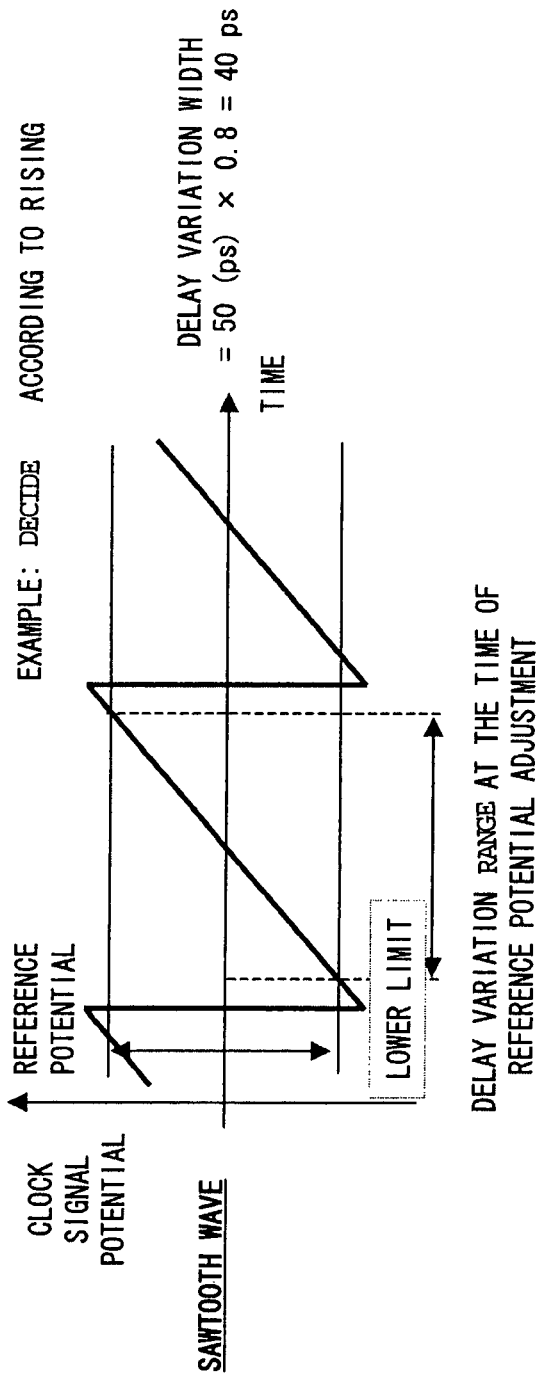
FIG. 17 illustrates an example of the embodiments.

For example, while the clock signal input from the clock signal source 6 is a sinusoidal signal in the above-described embodiments, the present invention is not limited thereto. For example, it may be a triangular signal as illustrated in FIG. 16, or may be a sawtooth signal as illustrated in FIG. 17. When the clock signal is the triangular signal illustrated in FIG. 16 and has a frequency of 20 GHz, if the reference signal potential that can be decided by the waveform shapers 4-1 and 4-2 (4B-1 and 4B-2) is 10 to 90 percent of the amplitude value, a delay variation width of 20 ps can be obtained. When the clock signal is the sawtooth signal illustrated in FIG. 17 and has a frequency of 20 GHz, if the reference signal potential that can be decided by the waveform shapers 4-1 and 4-2 (4B-1 and 4B-2) is 10 to 90 percent of the amplitude value, a delay variation width of 40 ps can be obtained. Therefore, by using the triangular signal or the sawtooth signal as the clock signal, the delay variation width can be made large compared with the delay variation width (15 ps) of the sinusoidal signal of 20 GHz.

While the DQPSK modulator is applied as the multi-level phase modulator in the above-described embodiments, the present invention is not limited thereto, and may be applied to a structure that performs a phase modulation of multiple levels higher than four values, or to a structure that performs a phase modulation other than the differential phase shift keying modulation such as a QPSK modulation.

Further, while the structure that compensates for the phase difference in the device structure having the DQPSK modulator 2 (2A) and the RZ modulator 3 (3A) as the multi-level phase modulator is described in detail in the above-described embodiments, the embodiments may be applied to compensate for the phase difference such as the phase difference between the I and Q arms in a structure at least having a multi-level phase modulator.

While in the above-described first embodiment, the frequency signal f0 is superimposed on the reference signal and the adjuster 5h-2 adjusts the relative level ratio by adjusting the direct current component of the reference signal so that the component of the frequency f0 detected by the synchronous detector 5g is minimum (0) by the reference adjustment value, according to the embodiments, the adjuster 5h-2 of the first embodiment may be replaced with the adjuster 5k-2 of the third embodiment to adjust the DC level of the clock signal.

Further, while in the third embodiment, the frequency signal f0 is superimposed on the DC level of the clock signal and the adjuster 5k-2 adjusts the relative level ratio by adjusting the DC level of the clock signal so that the component of the frequency f0 detected by the synchronous detector 5g is minimum (0), according to the embodiments, the adjuster 5k-2 of the third embodiment may be replaced with the adjuster 5h-2 of the first embodiment to adjust the potential of the reference signal.

Moreover, the disclosure of the above-described embodiments enables persons skilled in the art to manufacture the device of the present invention.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc—Read Only Memory), and a CD-R (Recordable)/RW. An example of communication media includes a carrier-wave signal.

Further, according to an aspect of the embodiments, any combinations of the described features, functions and/or operations can be provided.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. An optical modulation device comprising:
   a plurality of waveform shapers that waveform-shape a plurality of input data signals in synchronism with a rising or falling timing based on comparison with a reference level of an input clock signal;
   a multi-level phase modulator that generates a multi-level-phase-modulated optical signal based on the plurality of data signals waveform-shaped by the plurality of waveform shapers, and outputs the generated optical signal; and
   a level ratio controller that varies a relative level ratio of the reference level to an amplitude level of the clock signal input to the plurality of waveform shapers, based on the optical signal output from the multi-level phase modulator.

2. The optical modulation device according to claim 1, wherein the level ratio controller comprises:
   a varier that varies the relative level ratio of the reference level to the amplitude level of the clock signal according to a predetermined frequency;
   an extractor that extracts a component of the predetermined frequency from the optical signal output from the multi-value phase modulator; and
   an adjuster that adjusts a median of the relative level ratio periodically varied by the varier, based on the component of the predetermined frequency extracted by the extractor.

3. The optical modulation device according to claim 2, wherein the varier comprises:

an oscillation circuit that generates a signal of the predetermined frequency; and
a frequency component superimposer that superimposes the signal of the predetermined frequency output from the oscillation circuit, on the clock signal input to the plurality of waveform shapers or on a reference level signal providing the plurality of waveform shapers with the reference level, and supplies the superimposition signal to the plurality of waveform shapers.

4. The optical modulation device according to claim 3, wherein the adjuster adjusts the median of the relative level ratio by adjusting an DC level of a waveform of the clock signal input to the plurality of waveform shapers, so that the component of the predetermined frequency extracted by the extractor is minimum.

5. The optical modulation device according to claim 3, wherein the adjuster adjusts the median of the relative reference level ratio of the reference level to the amplitude level of the clock signal input to the plurality of waveform shapers, by adjusting the reference level signal so that the component of the predetermined frequency extracted by the extractor is minimum, and supplying the adjusted reference level signal to the waveform shapers.

6. The optical modulation device according to claim 3, wherein the plurality of waveform shapers are structured as two waveform shapers that waveform-shape two input data signals in synchronism with the rising or falling timing based on comparison with the reference level of the input clock signal, and
wherein a signal inverter is further provided that inverts one of the signals of the predetermined frequency supplied to the plurality of waveform shapers through the superimposition on the clock signal or on the reference level signal.

7. The optical modulation device according to claim 2, wherein the extractor extracts the component of the predetermined frequency from the optical signal based on the signal of the predetermined frequency output from an oscillation circuit.

8. The optical modulation device according to claim 1, further comprising a first RZ modulator that RZ (return to zero)-modulates the optical signal output from the multi-level phase modulator, based on the clock signal,
wherein the level ratio controller varies the relative level ratio of the reference level to the amplitude level of the clock signal input to the plurality of waveform shapers, based on a first RZ optical signal output from the first RZ modulator.

9. The optical modulation device according to claim 1, further comprising a second RZ modulator that generates a second RZ optical signal RZ-modulated based on the clock signal, and outputs the generated signal,
wherein the multi-level phase modulator generates the multi-level-phase-modulated optical signal from the second RZ optical signal from the second RZ modulator, and outputs the generated signal.

10. The optical modulation device according to claim 8 or claim 9,
wherein the plurality of waveform shapers are structured as two waveform shapers that waveform-shape two input data signals in synchronism with the rising or falling timing based on comparison with the reference level of the input clock signal,
wherein the level ratio controller comprises:

a varier that varies the relative level ratio of the reference level to the amplitude level of the clock signal according to a predetermined frequency;

an extractor that extracts a component of the predetermined frequency from the optical signal output from the first RZ modulator or the multi-level phase modulator; and an adjuster that adjusts a median of the relative level ratio periodically varied by the varier, based on the component of the predetermined frequency extracted by the extractor, wherein the varier comprises:

an oscillation circuit that generates a signal of the predetermined frequency; and a frequency component superimposer that superimposes the signal of the predetermined frequency output from the oscillation circuit, on the clock signal input to the two waveform shapers or on a reference level signal providing the plurality of waveform shapers with the reference level, and supplies the superimposition signal to the two waveform shapers, and wherein a signal inverter is further provided that inverts one of the signals of the predetermined frequency oscillated by the oscillation circuit and supplied to the plurality of waveform shapers through the superimposition on the clock signal or on the reference level signal by the frequency component superimposer.

11. The optical modulation device according to claim 10, further comprising a switcher that switches between inversion and non-inversion of the signal of the predetermined frequency at the signal inverter.

12. The optical modulation device according to claim 10, wherein the extractor comprises:

a coupler that branches part of the optical signal output from the first RZ modulator or the multi-level phase modulator;

a receiver that receives the part of the optical signal branched by the coupler, and converts the received signal into an electric signal; and a synchronous detector that extracts the component of the predetermined frequency contained in the electric signal from the receiver, by synchronous detection based on the signal of the predetermined frequency from the oscillation circuit.

13. The optical modulation device according to claim 1, wherein the plurality of waveform shapers are structured as two waveform shapers that waveform-shape two input data signals in synchronism with the rising or falling timing based on comparison with the reference level of the input clock signal, and wherein the multi-level phase modulator performs a DQPSK (differential quadrature phase shift keying) modulation based on the two data signals waveform-shaped by the two waveform shapers.

14. The optical modulation device according to claim 1, comprising a phase shifter that applies a semi-fixed phase shift to the clock signal supplied by at least one of the plurality of waveform shapers.

15. The optical modulation device according to claim 8, comprising a phase shifter that applies a semi-fixed phase shift to the clock signal supplied by at least one of the plurality of waveform shapers and the first RZ modulator.

16. The optical modulation device according to claim 9, comprising a phase shifter that applies a semi-fixed phase shift to the clock signal supplied by at least one of the plurality of waveform shapers and the second RZ modulator.

17. The optical modulation device according to claim 1, further comprising a clock signal source that generates the clock signal.

18. The optical modulation device according to claim 17, wherein the clock signal source outputs a sinusoidal signal as the clock signal.

19. The optical modulation device according to claim 17, wherein the clock signal source outputs a triangular signal as the clock signal.

20. The optical modulation device according to claim 17, wherein the clock signal source outputs a sawtooth signal as the clock signal.

21. An optical transmitter provided with the optical modulation device according to claim 1.

22. An optical modulation method comprising:

waveform-shaping a plurality of input data signals in synchronism with a rising or falling timing based on comparison with a reference level of an input clock signal;

generating a multi-level-phase-modulated optical signal based on the plurality of waveform-shaped data signals, and outputting the generated signal; and varying a relative level ratio of the reference level to an amplitude level of the clock signal based on the multi-level-phase-modulated optical signal, the relative level ratio serving as a reference to determine a timing of the waveform shaping of the plurality of data signals.

23. The optical modulation method according to claim 22, wherein when the relative level ratio is varied, the relative level ratio of the reference level to the amplitude level of the clock signal in performing the waveform shaping is varied according to a predetermined frequency;

a component of the predetermined frequency is extracted from the multi-level-phase-modulated optical signal; and a median of the periodically varied relative level ratio is adjusted based on the extracted component of the predetermined frequency.

* * * * *